United States Patent
Tachibana

(10) Patent No.: US 8,740,164 B2
(45) Date of Patent: Jun. 3, 2014

(54) ATTACHMENT DEVICE FOR SUSPENDED MEMBER

(75) Inventor: Toshitaka Tachibana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 13/149,476

(22) Filed: May 31, 2011

(65) Prior Publication Data

US 2011/0297810 A1 Dec. 8, 2011

(30) Foreign Application Priority Data

Jun. 3, 2010 (JP) ................................ 2010-127535

(51) Int. Cl.
*E04G 3/00* (2006.01)

(52) U.S. Cl.
USPC .................. 248/276.1; 248/278.1; 248/917; 248/923

(58) Field of Classification Search
USPC ............... 248/276.1, 278.1, 279.1, 917–923; 361/679.01, 679.21
See application file for complete search history.

(56) References Cited

U.S. PATENT DOCUMENTS

| | | | | |
|---|---|---|---|---|
| 6,604,722 B1 * | 8/2003 | Tan | | 248/276.1 |
| 7,300,029 B2 * | 11/2007 | Petrick et al. | | 248/285.1 |
| 7,441,739 B2 * | 10/2008 | Huang | | 248/292.14 |
| 7,963,489 B2 * | 6/2011 | O'Keene et al. | | 248/201 |
| 8,245,990 B2 * | 8/2012 | Huang | | 248/276.1 |
| 2011/0101185 A1 | 5/2011 | Kitaguchi | | |

FOREIGN PATENT DOCUMENTS

| | | |
|---|---|---|
| CN | 2829019 Y | 10/2006 |
| CN | 101660649 A | 3/2010 |
| JP | 63-268867 | 11/1988 |
| JP | 10-319874 | 12/1988 |
| JP | 2000-338899 | 12/2000 |
| JP | 2001-022302 | 1/2001 |
| JP | 2002-196687 | 7/2002 |
| JP | 2002-215053 | 7/2002 |
| JP | 2003-15541 A | 1/2003 |
| JP | 2006-53212 A | 2/2006 |

* cited by examiner

*Primary Examiner* — Amy J Sterling
(74) *Attorney, Agent, or Firm* — Birch, Stewart, Kolasch & Birch, LLP.

(57) ABSTRACT

The attachment device has a fixing member fixed to an attachment surface, first and second operating parts are configured to be manipulated from one side in the first direction parallel to the attachment surface, a first member fixed movably in the first direction relative to the fixing member, the first member being configured to move the display device in the first direction relative to the fixing member based on the operation amount of the first operating part, and a second member fixed rotatably relative to the first member, the second member being rotated based on the operation amount of the second operating part and being configured to move the display device in the second direction relative to the fixing member.

8 Claims, 26 Drawing Sheets

F I G. 1
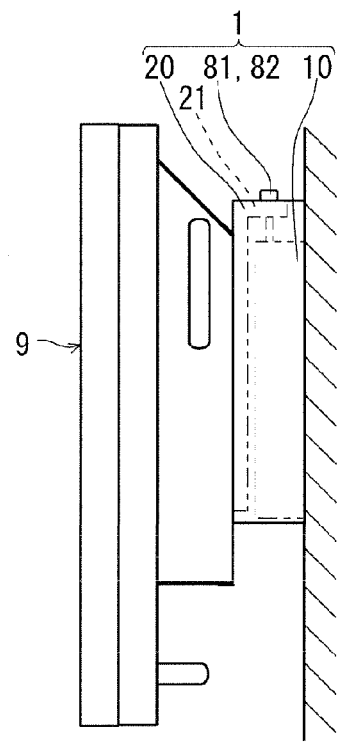
F I G. 2
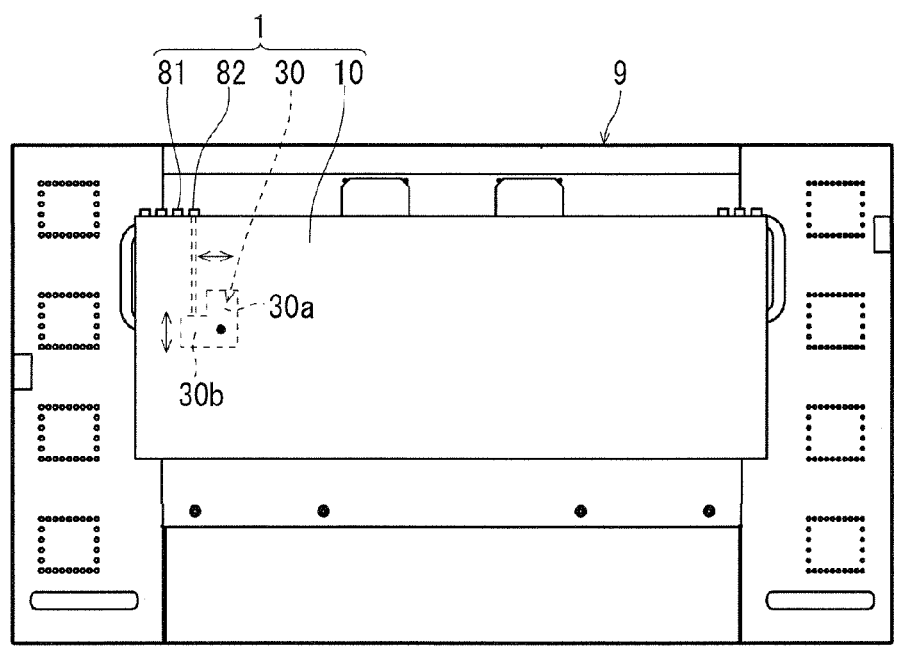

F I G . 9
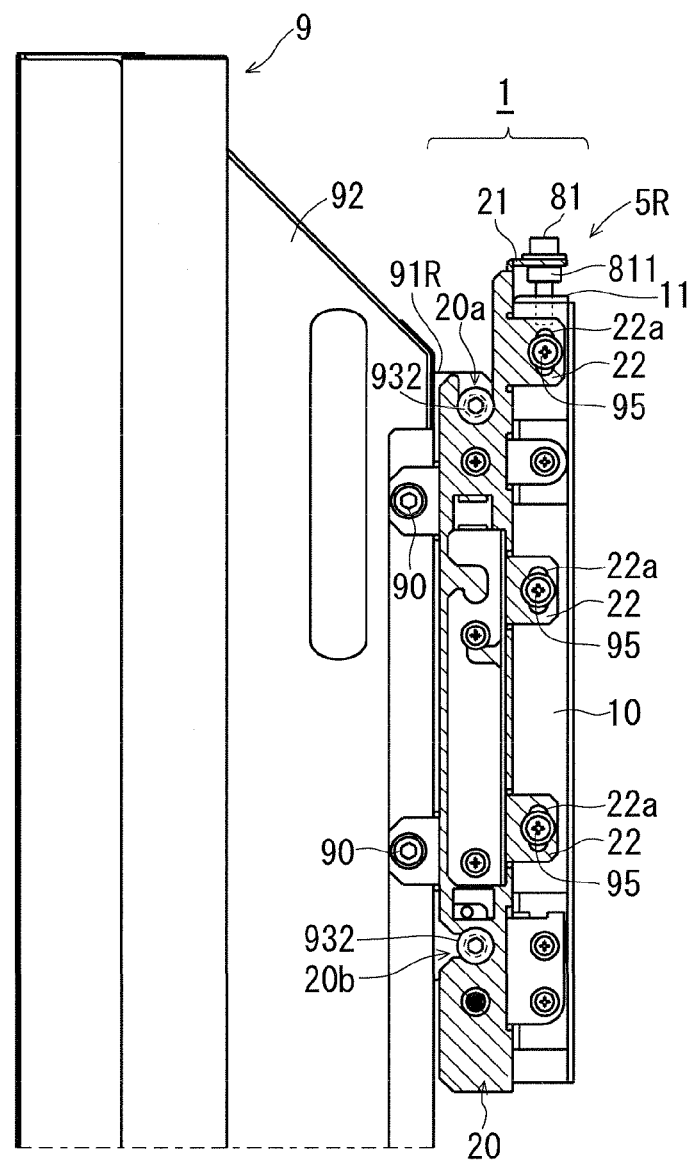

ATTACHMENT DEVICE FOR SUSPENDED MEMBER

BACKGROUND OF THE INVENTION

1. Field of the Invention

The present invention relates to an attachment device for a suspended member, for example, an attachment device regarding a display apparatus having a large screen formed by arranging a plurality of thin display devices with multi-tiling.

2. Description of the Background Art

There is a large-screen display apparatus in which a plurality of display devices is arranged with multi-tiling (that is, aligned in the vertical and horizontal directions) and all these display devices are regarded as one screen. Conventionally, a rear projection projector capable of displaying an image even in an end of a screen is mainly adopted as the individual display devices. However, in recent years, even in a thin display apparatus represented by a liquid crystal display, a narrow bezel type thin display device specialized for the multi-tiling has been developed to be a product.

Since such a thin display device has small thickness unlike the rear projection projector, the thin display device can be installed while being attached to a wall surface. For example, Japanese Patent Application Laid-Open Nos. 2003-15541 and 2006-53212 describe a wall-hanging device for attaching a thin display to a wall surface. In more detail, Japanese Patent Application Laid-Open No. 2003-15541 describes a technology of moving a display device in the left and right direction from a state that the display device is in contact with an attachment member in the up and down direction, fitting the display device and the attachment member to each other when reaching a proper positional relationship, and thereby fixing the display device to the attachment member, and a technology of providing a tilt mechanism. Japanese Patent Application Laid-Open No. 2006-53212 discloses a wall-hanging device easily attachable to and detachable from a wall surface.

FIGS. 27 and 28 show one schematic example of a large-screen display apparatus obtained by arranging a plurality of display devices with multi-tiling. FIG. 27 is a front view of the large-screen display apparatus, and FIG. 28 is a side view of the large-screen display apparatus. In the example of FIGS. 27 and 28, four display devices 100a to 100d are arranged two by two.

However, when the display devices 100a to 100d are attached to the wall surface with adopting the wall-hanging device described in Japanese Patent Application Laid-Open Nos. 2003-15541 and 2006-53212, there is a possibility that the display devices 100a to 100d are not arranged in proper posture and at proper positions relative to each other.

FIG. 29 is an enlarged view showing a region A including all the four display devices 100a to 100d (also refer to FIG. 27). FIG. 30 is an enlarged view showing a region B including both the two display devices 100a and 100b (or 100c and 100d) arranged in the up and down direction (also refer to FIG. 28). In the example of FIG. 29, the display device 100c on the upper right side is displaced in the upper right direction from the proper position, and a gap is generated between the display device 100c and the adjacent display devices 100a and 100d. Furthermore, when seen from the front side, the display device 100c is arranged while being tilted relative to the display devices 100a, 100d. In a case where the display device 100c is arranged in such a way, a portion where an image is missing is broadened between the display device 100c and the display devices 100a and 100d.

In the example of FIG. 30, the upper display device 100a (or 100c) is displaced forward (in one direction perpendicular to a screen) relative to the lower display device 100b (or 100d). In a case where the display device 100c is arranged in such a way, the portion where the image is missing is broadened when the screen is seen from the oblique directions D1 and D2, for example. This is because an upper portion of the display device 100b is hidden by the display device 100a when seen from the direction D1, and the portion where the image is missing is generated between the display devices 100a and 100b when seen from the direction D2.

As described above, in a case where the display devices 100a to 100d are not arranged in the proper posture and at the proper positions relative to each other, quality of the image is lowered. Appearance quality and an aesthetic property of the large-screen display apparatus are also deteriorated.

SUMMARY OF THE INVENTION

It is an object of the present invention to provide an attachment device for a suspended member capable of suppressing a missing image at least in two directions and furthermore, realizing easy operation.

An attachment device for a suspended member according to the present invention is an attachment device to be placed between the suspended member and an attachment surface to attach the suspended member to the attachment surface. The attachment device includes a fixing member, at least one first operating part, at least one second operating part, at least one first member, and at least one second member. The fixing member is fixed to the attachment surface. The first operating part is configured to be manipulated from one side in the first direction parallel to the attachment surface. The second operating part is configured to be manipulated from the one side in the first direction. The first member is fixed movably in the first direction relative to the fixing member, and configured to move the suspended member in the first direction relative to the fixing member based on the operation amount of the first operating part. The second member is fixed rotatably relative to the first member, configured to rotate based on the operation amount of the second operating part, and configured to move the suspended member in the second direction relative to the fixing member.

With the attachment device according to the present invention, a display device can be moved in the first direction and the second direction by manipulating the operation amounts of the first and second operating parts. Furthermore, since both the first and second operating parts are operated from the one side in the first direction, a position of the display device is easily adjusted.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a side view showing one schematic example of an attachment device and a thin display device;

FIG. 2 is a back view showing one schematic example of the attachment device and the thin display device;

FIG. 9 is a side view showing one conceptual example of an up and down adjustment mechanism;

DESCRIPTION OF THE PREFERRED EMBODIMENTS (Overview of Attachment Device) Before detailed description of an attachment device 1, an overview thereof will be briefly described at first. FIG. 1 is a side view showing one schematic example of a state that the attachment device 1 is attached to a thin display device 9, and FIG. 2 is a back view thereof. The attachment device 1 is placed between the thin display device 9 and an attachment surface so as to fix the thin display device 9 to the attachment surface. The attachment surface is for example a wall surface. Hereinafter, the wall surface will be described as the attachment surface. It should be noted that in the following description, the normal direction of the wall surface is called as the front and rear direction, the vertical direction when the thin display device 9 is seen on the front side is called as the up and down direction, and the direction perpendicular to the normal direction and the up and down direction is called as the left and right direction. The wall surface side in the front and rear direction is called as the rear side, and the side of the thin display device 9 in the front and rear direction is called as the front side.

Figure 3:
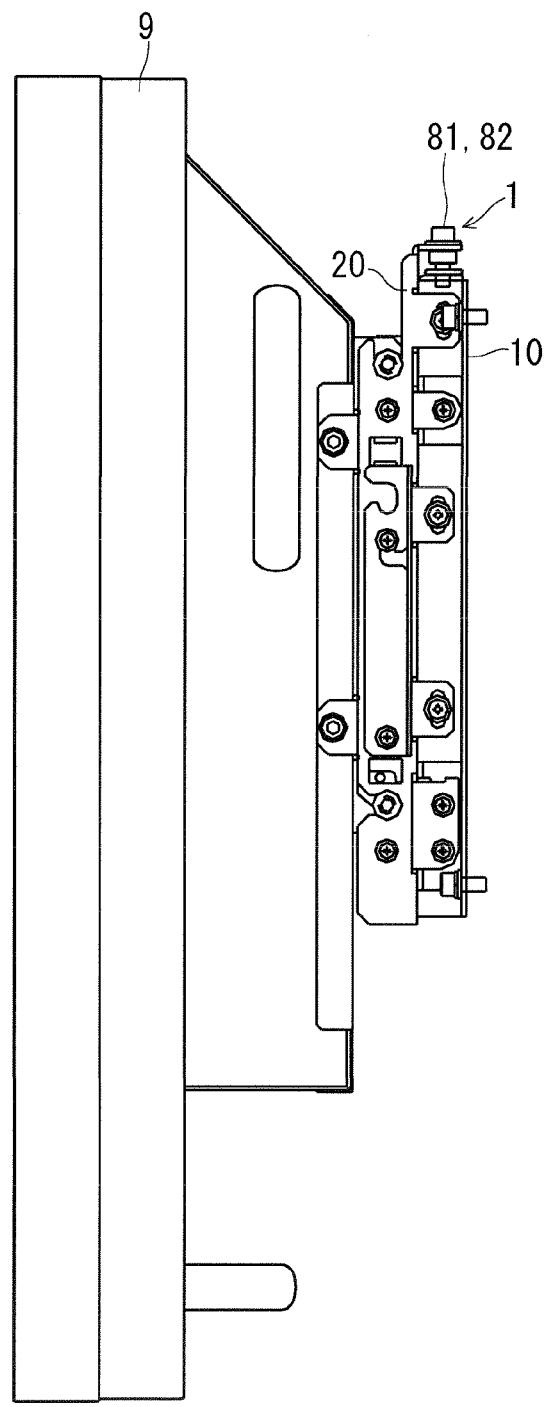
FIG. 3 is a side view showing one conceptual example of the attachment device and the thin display device.

The attachment device 1 has a fixing member (hereinafter, called as the base plate) 10 and a first member 20. It should be noted that in FIG. 1, one example of the base plate 10 and one example of the first member 20 are shown by double chain lines, so as to emphasize that this is a schematic view. The base plate 10 is fixed to the wall surface, and the thin display device 9 is attached to the first member 20.

The attachment device 1 also has operating parts 81 and 82 for adjusting a position of the thin display device 9. Operation amounts of both the operating parts 81 and 82 are manipulated by a user or an operator from one side (upper side in the example of FIGS. 1 and 2) in the first direction parallel to the wall surface (up and down direction in the example of FIGS. 1 and 2).

The first member 20 is fixed movably in the first direction relative to the base plate 10, so as to move the thin display device 9 in the first direction relative to the base plate 10 based on the operation amount of the operating part 81. One example of a specific structure of the base plate 10, the first member 20, and the operating part 81 for realizing such a function will be described in detail later, and an overview thereof will be described next.

The first member 20 is moved together with the thin display device 9 in the first direction. This can be realized for example by supporting part of the thin display device 9 in the up and down direction with the first member 20 when the first direction is along the up and down direction. When the first direction is along the left and right direction, this may be realized for example by nipping part of the thin display device 9 in the left and right direction with the first member 20.

The operating part 81 is arranged in a portion of the attachment device 1 on the one side in the first direction, so as to be operated from the one side in the first direction. For example, the first member 20 is provided with a bent part 21 positioned on the one side in the first direction relative to the base plate 10. A male screw member (such as an adjustment bolt) serving as one example of the operating part 81 passes through the bent part 21 in the first direction and is screwed into the base plate 10. In order to position the bent part 21 in the first direction relative to the operating part 81, a positioning member is provided. As the positioning member, for example, a collar set for nipping the bent part 21 in the first direction together a screw head of the operating part 81 is adopted.

With such a structure, a distance between the screw head of the adjustment bolt 81 and the base plate 10 is changed by rotation of the operating part 81. That is, the first member 20 is moved in the first direction relative to the base plate 10. Thereby, the thin display device 9 can be moved in the first direction.

A second member 30 is rotatably fixed to the first member 20. This is realized by a predetermined screw passing through the second member 30 and being screwed into the first member 20.

The second member 30 is rotated based on the operation amount of the operating part 82, so as to move the thin display device 9 in the second direction (left and right direction in the example of FIG. 2) relative to the base plate 10. One specific example of the first member 20, the second member 30, and the operating part 82 for realizing such a function will be described in detail later, and an overview thereof is as follows.

That is, the second member 30 is fixed to the first member 20 rotatably on a rotation axis (front and rear direction in the example of FIG. 2) perpendicular to the second direction. A load point portion 30a of the second member 30 displaced in the first direction from the rotation axis imposes force in the second direction onto the thin display device 9. This can be realized for example by nipping part of the thin display device 9 in the second direction with the load point portion 30a. It should be noted that when the second direction is the up and down direction, the load point portion 30a may support part of the thin display device 9 in the up and down direction.

The operating part 82 for rotating the second member 30 is operated from the one side in the first direction as well as the operating part 81. For example, a male screw member (such as an adjustment bolt) serving as one example of the operating part 82 passes through the bent part 21 from the one side in the first direction. In order to fix the operating part 82 in the first direction relative to the bent part 21, a positioning member is provided.

By such rotation of the operating part 82, force in the first direction is imposed onto an effort point portion 30b of the second member 30 displaced in the second direction from the rotation axis. By movement of the effort point portion 30b in the first direction, the second member 30 is consequently rotated. Thereby, based on a rotation amount (operation amount) of the operating part 82, the thin display device 9 can be moved in the left and right direction.

As described above, the thin display device 9 can be moved in the first direction and the second direction by the operating parts 81 and 82. Therefore, in a case where a plurality of thin display devices 9 is arranged with multi-tiling so as to assemble a large-screen display apparatus, a portion where an image is missing generated between the thin display devices 9 can be reduced.

Furthermore, since both the operating parts 81 and 82 are operated from the one side in the first direction, these parts can be easily operated. When the operating parts 81 and 82 are operated from the upper side as described above, after the plurality of thin display devices 9 is aligned in one row in the horizontal direction, position adjustment can be performed for each row. That is, arrangement and the position adjustment for the thin display devices 9 can be collectively performed for each row.

Figure 4:
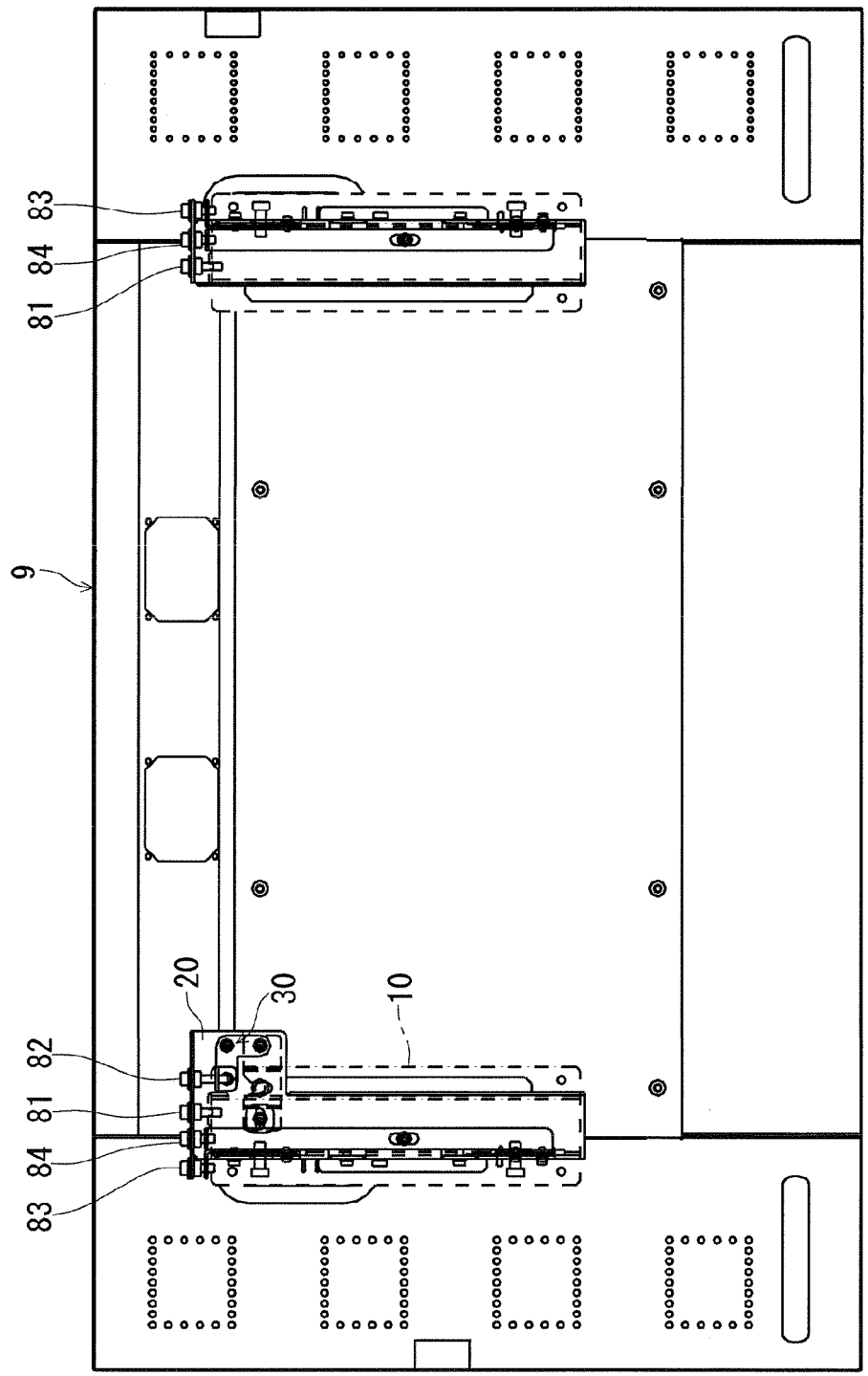
FIG. 4 is a back view showing one conceptual example of the attachment device and the thin display device.

Hereinafter, one example of the attachment device 1 according to the present preferred embodiment will be described in more detail. For reference, FIGS. 3 and 4 are detailed views corresponding to FIGS. 1 and 2. A detailed structure of the attachment device 1 will be elucidated in the later description.

Before description of the position adjustment of the thin display device 9 with the attachment device 1, one example of a method of attaching the thin display device 9 to the attachment device 1 will be described.

(One Example of Attachment of Display Device to Attachment Device) Firstly, members relating to attachment on the side of the thin display device 9 will be described, then members relating to attachment on the side of the attachment device 1 will be described, and successively, the method of attaching the thin display device 9 to the attachment device 1 will be described.

Figure 5:
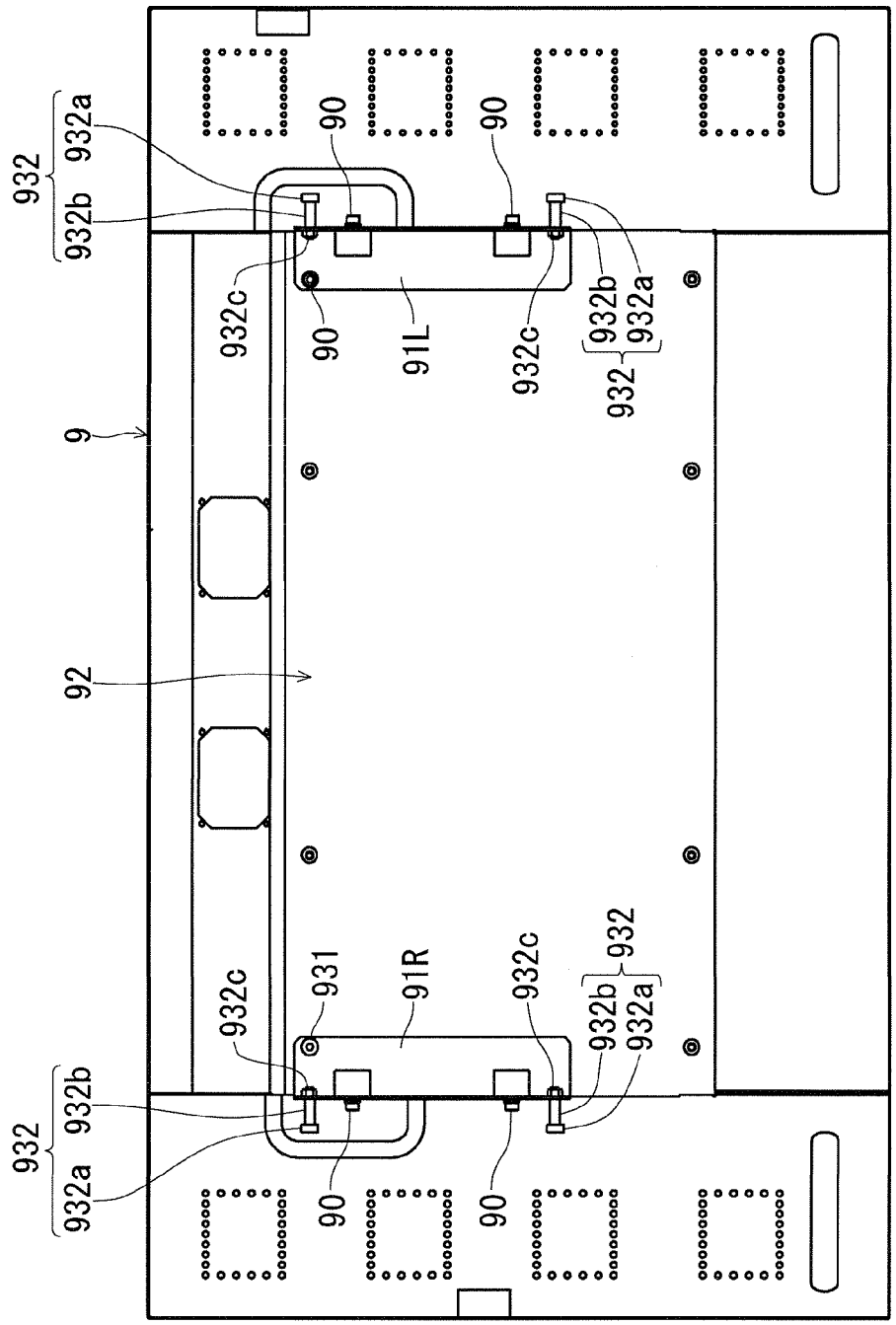
FIG. 5 is a back view showing one conceptual example of the thin display device.
Figure 6:
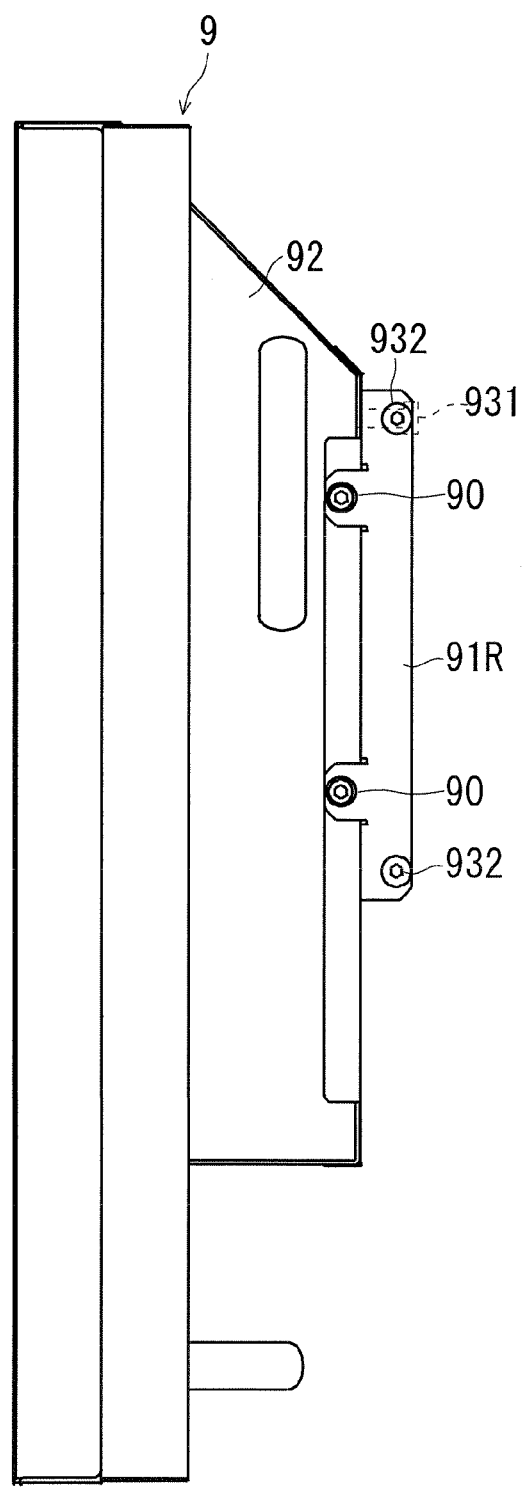
FIG. 6 is a side view showing one conceptual example of the thin display device.

FIGS. 5 and 6 are respectively a back view and a side view of one example of the thin display device 9. A plurality of stripper bolts 932 is attached on the rear side of the thin display device 9. Each of the stripper bolts 932 has a shape in which a screw head 932a, a non-threaded columnar part 932b, and a threaded screw part are continuous to each other in this order. In the example of FIGS. 5 and 6, the stripper bolts 932 are screwed on both side surfaces in the left and right direction of the thin display device 9. Thereby, the stripper bolts 932 are fixed in posture of protruding from the thin display device 9 in the left and right direction.

As described later, the stripper bolts 932 (in more detail, the columnar parts 932b) are supported by the attachment device 1. Thereby, the thin display device 9 is attached to the attachment device 1.

It should be noted that the members supported by the attachment device 1 are not limited to the stripper bolts 932, but in essence, protruding members projecting from the thin display device 9 in the left and right direction are only required to be provided and supported by the attachment device 1.

In the example of FIGS. 5 and 6, the stripper bolts 932 are not directly fixed to the thin display device 9 but fixed to the thin display device 9 through brackets 91R and 91L. The brackets 91R and 91L have a T shape when seen along the up and down direction. The brackets 91R and 91L are respectively in contact with side surfaces and a back surface of the thin display device 9 on the both sides in the left and right direction of the thin display device 9. It should be noted that in the example of FIGS. 5 and 6, a housing unit 92 housing electronic parts and the like is provided on the back surface of the thin display device 9. The brackets 91R and 91L are attached to this housing unit 92. Each of the brackets 91R and 91L is fixed on a side surface of the housing unit 92 for example with two bolts 90.

The stripper bolts 932 are attached to the brackets 91R and 91L. In the example of FIGS. 5 and 6, the stripper bolts 932 pass through surfaces of the brackets 91R and 91L not in contact with the housing unit 92 in the left and right direction (refer to FIG. 6), and are screwed into nuts 932c, so that the stripper bolts 932 are fixed to the brackets 91R, 91L (refer to FIG. 5). With such a structure, the screw heads 932a and the columnar parts 932b are positioned in a space on the opposite side of the nuts 932c relative to the brackets 91R and 91L. That is, the stripper bolts 932 can be fixed in posture of protruding from the brackets 91R and 91L in the left and right direction.

In the example of FIGS. 5 and 6, the two stripper bolts 932 are respectively fixed to an upper portion and a lower portion of the bracket 91R, and the two stripper bolts 932 are respectively fixed to an upper portion and a lower portion of the bracket 91L. With this, the thin display device 9 can be attached to the attachment device 1 at four points, contributing to stable holding of the thin display device 9.

In the example of FIGS. 5 and 6, the brackets 91R and 91L are respectively fixed on a back surface of the housing unit 92 with a stripper bolt 931 and a bolt 90. Thereby, since the brackets 91R and 91L are fixed on two surfaces of the side surface and the back surface of the housing unit 92, the brackets are more firmly fixed.

It should be noted that in a view of fixing the bracket 91R to the housing unit 92, the stripper bolt 931 is not necessarily adopted but a simple bolt may be used. However, since the stripper bolt 931 can be utilized for the position adjustment of the thin display device 9, the stripper bolt 931 is adopted is adopted in the example of FIGS. 5 and 6. This point will be described in detail later.

Figure 7:
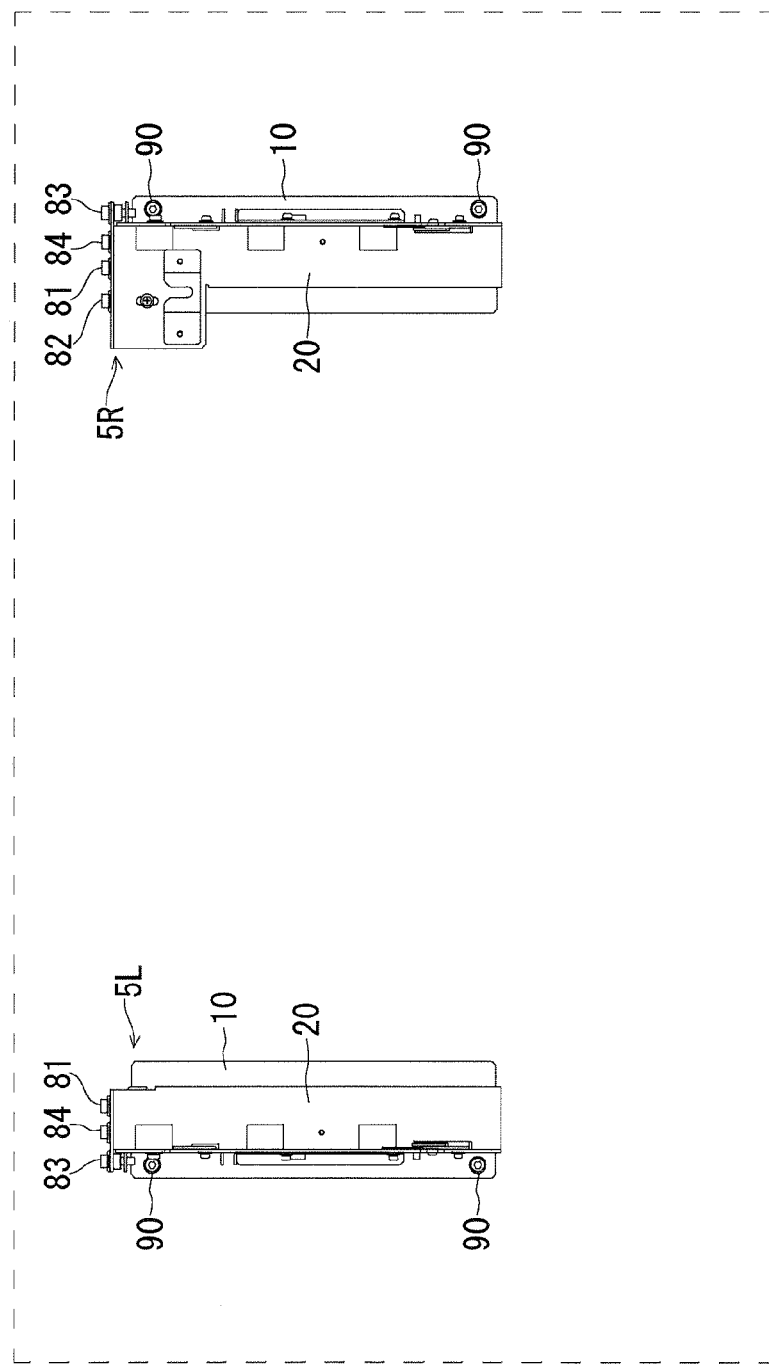
FIG. 7 is a front view showing one conceptual example of the attachment device.

Next, the attachment device 1 will be described. FIG. 7 is a front view showing one example of the attachment device 1. Thus, in FIG. 7, the far side of a paper plane is a wall surface.

In FIG. 7, in order to easily see a positional relationship between the attachment device 1 and the thin display device 9, an outline of the thin display device 9 to be arranged on the near side of the paper plane is shown by phantom lines.

As shown in the example of FIG. 7, the attachment device 1 has wall-hanging units 5R and 5L. The wall-hanging units 5R and 5L are respectively fixed to the wall surface. In the example of FIG. 7, each of the wall-hanging units 5R and 5L is fixed to the wall surface with two bolts 90.

Figure 8:
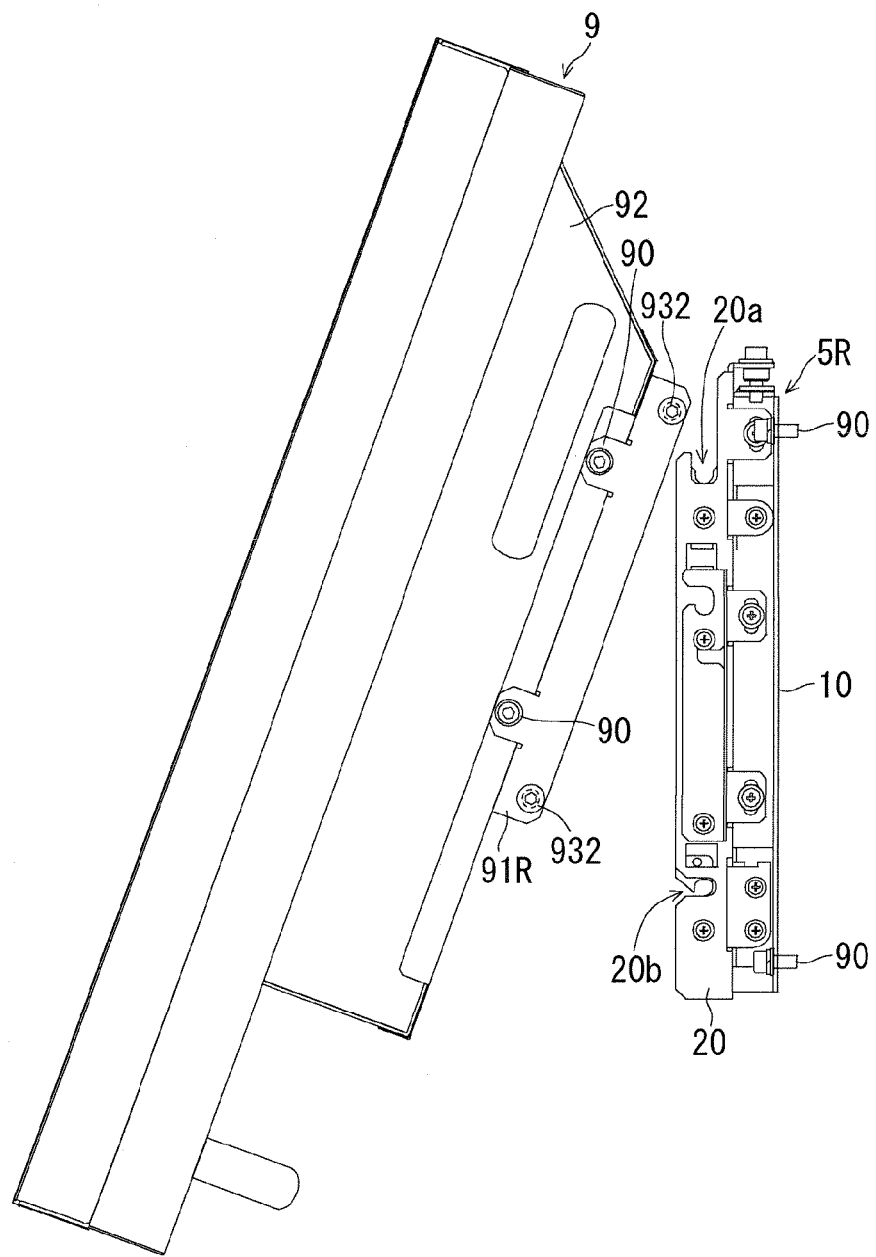
FIG. 8 is a side view showing a state that the thin display device is attached to the attachment device.

The wall-hanging units 5R and 5L respectively have a structure of supporting the stripper bolts 932 fixed to the thin display device 9. A more detailed structure of the wall-hanging units 5R and 5L will be described also with reference to FIG. 8. FIG. 8 shows a state that the thin display device 9 is attached to the attachment device 1. Concave parts 20a and 20b are formed in the wall-hanging unit 5R. The concave part 20a opens upward in an upper portion of the wall-hanging unit 5R, and supports the stripper bolt 932 attached to the upper portion of the bracket 91R. The concave part 20b opens forward in a lower portion of the wall-hanging unit 5R, and supports the stripper bolt 932 attached to the lower portion of the bracket 91R.

Similarly, concave parts 20a and 20b are also formed in the wall-hanging unit 5L. In the wall-hanging unit 5L, the concave parts 20a and 20b respectively support the stripper bolts 932 attached to the upper and lower portions of the bracket 91L.

With such a structure, in a state that an upper portion of the thin display device 9 is brought close to the side of the attachment device 1 more than a lower portion thereof, the upper stripper bolts 932 (in more detail, the columnar parts 932b) fixed to the brackets 91R and 91L are respectively inserted into the concave parts 20a of the wall-hanging units 5R and 5L from the upper side. Successively, by pivoting the thin display device 9 on the upper stripper bolts 932 so that the lower stripper bolts 932 are brought close to the wall surface, the lower stripper bolts 932 (in more detail, the columnar parts 932b) are respectively inserted into the concave parts 20b of the wall-hanging units 5R and 5L. That is, the thin display device 9 is pivotally supported on the four stripper bolts 932 (also refer to FIG. 3).

It should be noted that in the example of FIG. 7, the wall-hanging units 5R and 5L are arranged side by side when seen from the up and down direction. In other words, these units are separated from each other in the left and right direction. It should be noted that such separation is not an essential requirement but these units may be integrated with each other. However, when the wall-hanging units 5R and 5L are separated from each other, in accordance with a distance between the stripper bolts 932 in the left and right direction, a distance between the wall-hanging units 5R and 5L is adjusted, and then these units can be fixed to the wall surface. Thus, for example, for plural types of thin display devices 9 having different distances between the stripper bolts 932 in the left and right direction, the same wall-hanging units 5R and 5L can be adopted.

Next, position adjustment mechanisms for the thin display device 9 provided in the attachment device 1 will be described.

Figure 10:
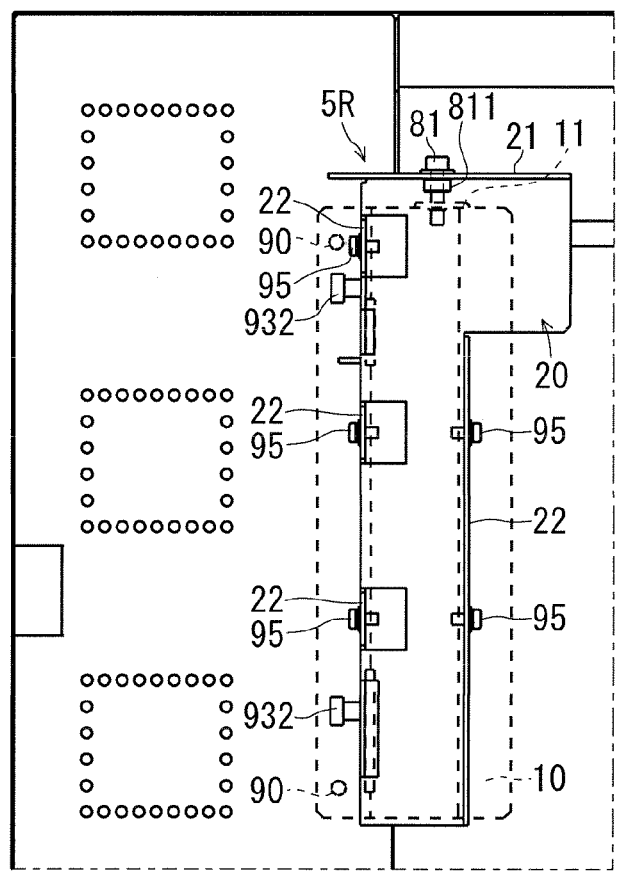
FIG. 10 is a back view showing one conceptual example of the up and down adjustment mechanism.

(Up and Down Adjustment Mechanism) FIG. 9 is a side view showing one example of an up and down adjustment mechanism for moving the thin display device 9 in the up and down direction, and FIG. 10 is a back view thereof. It should be noted that FIGS. 9 and 10 are enlarged views showing the vicinity of the wall-hanging unit 5R. In order to avoid complication in the figures, adjustment mechanisms for the directions other than the up and down direction are partly omitted. It should be noted that description will be given on the assumption that the wall-hanging units 5R and 5L respectively have the same up and down adjustment mechanism.

The wall-hanging unit 5R is provided with the base plate 10, and the first member 20 (hereinafter, called as the up and down moving member 20). In FIG. 10, the base plate 10 is shown by a broken line, and in FIG. 9, the up and down moving member 20 is shown by hatching. As shown in the example of FIG. 10, the base plate 10 is fixed to the wall surface for example with the two bolts 90. The up and down moving member 20 supports the thin display device 9 in the up and down direction. When description is given along the above example of attachment, the concave parts 20a and 20b are formed in the up and down moving member 20.

The wall-hanging unit 5R is provided with the operating part 81 for moving the up and down moving member 20 in the up and down direction relative to the base plate 10. In the example of FIGS. 9 and 10, the operating part 81 is provided in an upper portion of the wall-hanging unit 5R so as to be operated from the upper side. For example, the up and down moving member 20 has the bent part 21 bent and extending rearward (toward the side of the base plate 10) in an upper portion thereof. The bent part 21 is positioned on the upper side of the base plate 10. The operating part 81 is provided in this bent part 21.

In the example of FIGS. 9 and 10, the operating part 81 is formed by a male screw member (hereinafter, called as the adjustment bolt 81). The adjustment bolt 81 passes through a through hole provided in the bent part 21 from the upper side to the lower side.

The adjustment bolt 81 is rotatable relative to the bent part 21. A positioning member 811 for deciding a position in the up and down direction of the adjustment bolt 81 relative to the up and down moving member 20 is provided. For example, a set collar 811 is adopted as the positioning member 811. The set collar 811 is a circular member having a circular hollow core, and a screw portion of the adjustment bolt 81 passes through the hollow core. The set collar 811 is fixed to the adjustment bolt 81 on the lower side of the bent part 21. Thereby, the bent part 21 is nipped by the screw head of the adjustment bolt 81 and the set collar 811. Therefore, the adjustment bolt 81 is positioned in the up and down direction relative to the bent part 21.

Meanwhile, a first bent part 11 facing the bent part 21 in the up and down direction is provided in the base plate 10. A screw hole is provided in the first bent part 11, and the adjustment bolt 81 is screwed into this screw hole.

With such a structure, by rotating the adjustment bolt 81, a distance between the bent part 21 and the base plate 10 in the up and clown direction can be adjusted. That is, the up and down moving member 20 can be moved in the up and down direction relative to the base plate 10. Since the up and down moving member 20 supports the thin display device 9 in the up and down direction, the thin display device 9 can consequently be moved in the up and down direction relative to the base plate 10.

Figure 11:
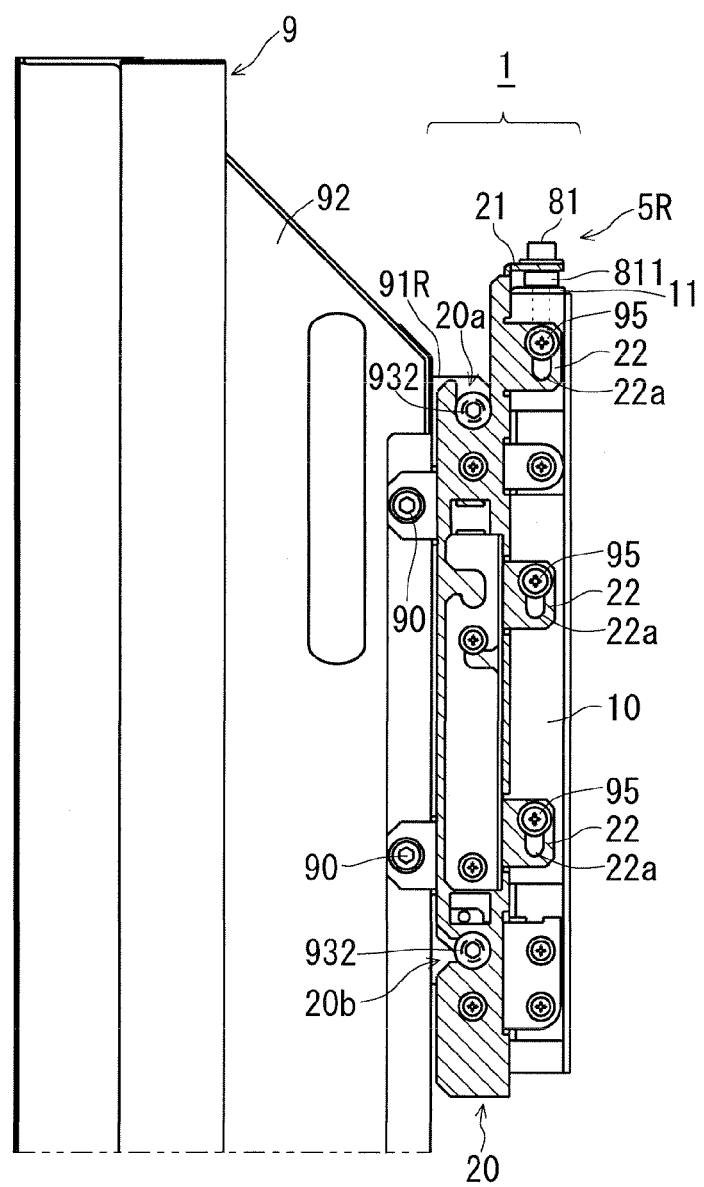
FIG. 11 is a side view showing one conceptual example of the up and down adjustment mechanism.

FIG. 11 shows a state that the adjustment bolt 81 is rotated in the fastening direction, so that the thin display device 9 is moved downward.

The same up and down adjustment mechanism as the wall-hanging unit 5R is also provided in the wall-hanging unit 5L. Therefore, when up and down movement is performed by the same amount in the same direction in both the wall-hanging units 5R and 5L, the thin display device 9 can be moved in parallel in the up and down direction. Meanwhile, when up and down movement by the different amount or up and down movement in the different direction is performed in the wall-hanging units 5R and 5L, a tilt of the thin display device 9 when seen along the front and rear direction can also be adjusted.

It should be noted that when a function of adjusting the tilt is not required, the two up and down moving members 20 respectively moved in the up and down direction by the operation amounts of the two operating parts 81 are not required to be arranged side by side when seen from the up and down direction. In other words, the attachment device 1 is not always required to have the wall-hanging units 5R and 5L. For example, when seen from the up and down direction, one up and down moving member may be arranged to support the four stripper bolts 932, and the one up and down moving member may be moved in the up and down direction by one operating part.

(Fixing Between Up and Down Moving Member 20 and Base Plate 10) Although the up and down moving member 20 and the base plate 10 are fixed to each other with the adjustment bolt 81, these are desirably fixed more firmly.

In the example of FIGS. 9 to 11, the up and down moving member 20 and the base plate 10 are fixed to each other at different positions from the adjustment bolt 81. For example, part of the up and down moving member 20 faces the base plate 10 in the left and right direction. This part is called as fixing portions 22. A long hole 22a passing through the fixing portion 22 in the left and right direction is formed in each of the fixing portions 22. The long holes 22a have an elongated shape in the up and down direction. Meanwhile, screw holes are formed at positions of the base plate 10 facing the long holes 22a. Screws 95 pass through the long holes 22a and are screwed into the screw holes. The screws 95 are for example shoulder screws for fixing the up and down moving member 20 slidably toward the side of the base plate 10 in the shoulder potion of screws 95.

With such a structure, within a range between a lower limit position where the screws 95 are in contact with the up and clown moving member 20 in upper portions of the long holes 22a (state of FIG. 11) and an upper limit position where the screws 95 are in contact with the up and down moving member 20 in lower portions of the long holes 22a, the up and down moving member 20 can be moved in the up and down direction relative to the base plate 10, and attachment between the up and down moving member 20 and the base plate 10 can be enhanced. When the arbitrary screws 95 are not the shoulder screws but normal screws, the screws 95 can be fastened at arbitrary positions so as to fix more firmly. It should be noted that even in a state that the screws 95 are fastened, the up and down moving member 20 can be moved relative to the base plate 10 with the adjustment bolt 81. This can be realized by adjusting fastening force of the screws 95.

In the example of FIG. 10, the up and down moving member 20 and the base plate 10 face each other in the left and right direction and are fixed to each other. However, the up and down moving member and the base plate may face each other in the front and rear direction and be fixed to each other with a similar structure. Places where the long holes and the screw holes are respectively provided may be switched the other way around. It should be noted that since the above contents of the fastening force of the screws, the direction in which the two members face each other, the places where the long holes and screw holes are provided are also applicable to other members described later, repetitive description will be avoided.

In the example of FIGS. 9 to 11, the up and down moving member 20 and the base plate 10 are fixed to each other at a plurality of points (such as six points with the adjustment bolt 81 and the five screws 95). Thereby, fixing force between the up and down moving member 20 and the base plate 10 can be enhanced.

(Left and Right Adjustment Mechanism) The thin display device 9 can be moved in the left and right direction even in a state that the thin display device is supported by the up and down moving member 20. This point will be described along the above example. The four stripper bolts 932 protrude in the left and right direction (also refer to FIG. 5). The four stripper bolts 932 protruding in the left and right direction respectively pass through the up and down moving member 20 in the left and right direction at the concave parts 20a and 20b. The columnar parts 932b are sufficiently longer than the concave parts 20a and 20b in the left and right direction. Thus, the stripper bolts 932 can slide at the concave parts 20a, 20b in the left and right direction so as to be moved. That is, when force in the left and right direction is imposed onto the thin display device 9, this device can be moved in the left and right direction. It should be noted that in the above example, by bringing the screw heads 932a of the stripper bolts 932 into contact with the up and down moving member 20 in the left and right direction, a movable range in the left and right direction of the thin display device 9 is restricted, and the stripper bolts 932 are prevented from dropping off the concave parts 20a and 20b.

Next, a mechanism for imposing the force in the left and right direction onto the thin display device 9 will be described. For example, the above stripper bolt 931 is utilized as a member onto which the force in the left and right direction is imposed (refer to FIGS. 5 and 6). The stripper bolt 931 protrudes rearward relative to the thin display device 9 (toward the side of the attachment device 1). By imposing the force in the left and right direction onto this stripper bolt 931, the thin display device 9 is moved in the left and right direction.

Figure 12:
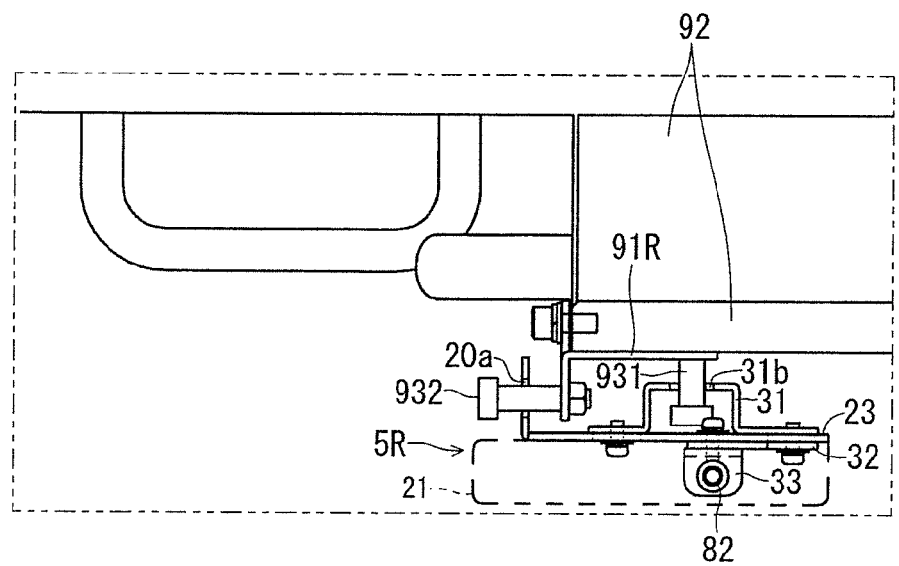
FIG. 12 is a top view showing one conceptual example of a left and right adjustment mechanism.
Figure 13:
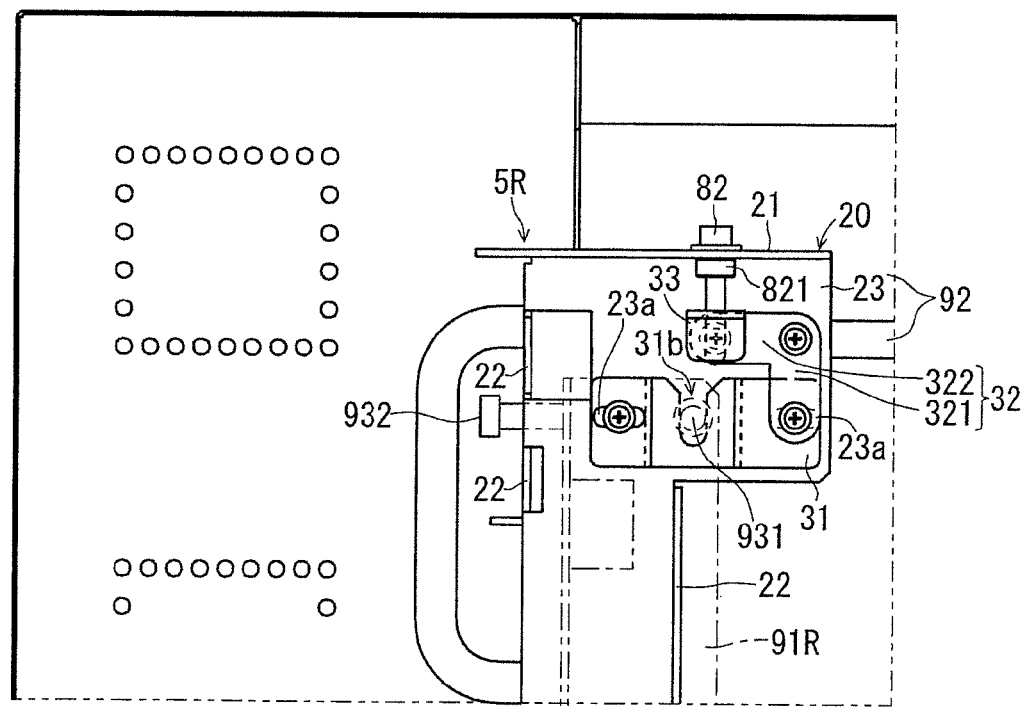
FIG. 13 is a back view showing one conceptual example of the left and right adjustment mechanism.
Figure 14:
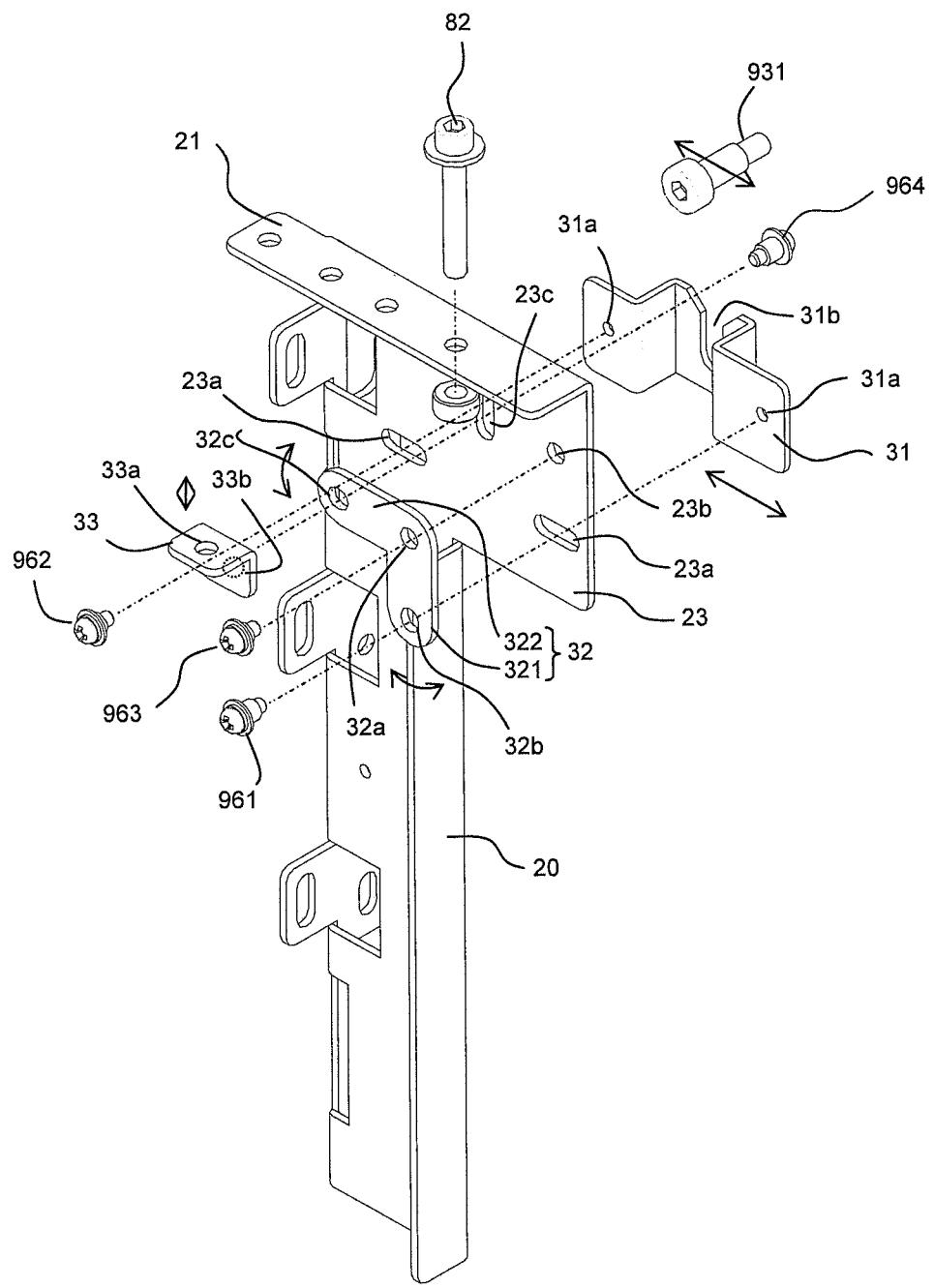
FIG. 14 is an exploded perspective view showing one schematic example of the left and right adjustment mechanism.

FIG. 12 is a plan view showing one example of a left and right adjustment mechanism, and FIG. 13 is a back view thereof. For easy understanding of the left and right adjustment mechanism in FIGS. 12 and 13, other parts are omitted. In FIG. 12, the bent part 21 is shown by a broken line and further transparently indicated. In FIG. 13, the up and down moving member 20 is shown by a solid line and further transparently indicated. FIG. 14 schematically shows one example of the left and right adjustment mechanism while breaked down into constituent elements.

A left and right moving member 31 is fixed to the up and down moving member 20 movably in the left and right direction. In the example of FIGS. 12 to 14, the up and down moving member 20 has a portion 23 facing the left and right moving member 31 in the front and rear direction. Two long holes 23a passing through the portion 23 along the front and rear direction are formed in the portion 23. The long holes 23a have an elongated shape in the left and right direction. Meanwhile, screw holes 31a are formed in portions of the left and right moving member 31 facing the long holes 23a in the front and rear direction. The screw holes 31a are formed in both side portions in the left and right direction of the left and right moving member 31. Screws 961, 962 respectively pass through the two long holes 23a and are screwed into the two screw holes 31a. With such a structure, within a range where at least one of the screws 961 and 962 is brought into contact with the up and down moving member 20 in the left and right direction in the long holes 23a, the left and right moving member 31 can be moved in the left and right direction relative to the up and down moving member 20.

The left and right moving member 31 is positioned on the front side of the portion 23 (side of the thin display device 9), and nips the stripper bolt 931 at least in the left and right direction. In the example of FIGS. 12 to 14, a concave part 31b opening upward and passing through the left and right moving member 31 in the front and rear direction is formed in the left and right moving member 31. The stripper bolt 931 is inserted into the concave part 31b from the upper side. Thus, when the left and right moving member 31 is moved in the left and right direction, in accordance with this, the force in the left and right direction is imposed onto the stripper bolt 931. Therefore, the thin display device 9 is moved in the left and right direction relative to the up and down moving member 20, eventually the base plate 10 in accordance with movement of the left and right moving member 31.

The operating part 82 for moving the left and right moving member 31 in the left and right direction is operated from the same direction (upper side) as the operating part 81. In the example of FIGS. 12 to 14, a male screw member serving as one example of the operating part 82 (hereinafter, called as the adjustment bolt 82) is provided in the bent part 21. A through hole passing through the bent part 21 in the up and down direction is provided in the bent part 21, and the adjustment bolt 82 passes through such a through hole of the bent part 21 from the upper side to the lower side. The adjustment bolt 82 is rotatable relative to the bent part 21. A positioning member 821 for deciding a position in the up and down direction of the adjustment bolt 82 relative to the up and down moving member 20 is provided. Since this point is the same as the adjustment bolt 81 and the positioning member 811, detailed description will be omitted.

The adjustment bolt 82 is screwed into a screw hole 33a formed in a joint member 33. Since the joint member 33 is not rotated taking the up and down direction as an axis as described later, a distance between the bent part 21 and the joint member 33 is adjusted by the rotation of the adjustment bolt 82. That is, the joint member 33 is moved in the up and down direction relative to the up and down moving member 20.

The joint member 33 and the left and right moving member 31 are fixed to each other through a link member 32. The link member 32 converts movement in the up and down direction of the joint member 33 into movement in the left and right direction so as to move the left and right moving member 31 in the left and right direction. In the example of FIGS. 12 to 14, the link member 32 has an L shape. In more detail, the link member 32 has a portion 321 extended in the up and down direction, and a portion 322 extended from one end in the up and down direction of the portion 321 toward one side in the left and right direction.

The link member 32 is fixed rotatably on a rotation axis perpendicular to the up and down direction and left and right direction (parallel to the front and rear direction) relative to the up and down moving member 20. In the example of FIGS. 12 to 14, a hole 32a passing through the link member 32 in the front and rear direction is formed in the link member 32. A screw hole 23b is formed in a portion of the portion 23 facing the hole 32a in the front and rear direction. A screw 963 loosely passes through the hole 32a and is screwed into the screw hole 23b. Thereby, the link member 32 is fixed rotatably taking the screw 963 as the rotation axis relative to the up and down moving member 20. It should be noted that even in a state that the screw 963 is fastened, the link member 32 can be rotated relative to the up and down moving member 20. When the screw 963 is for example a shoulder screw, this can be realized by inserting a shoulder portion thereof into the hole 32a of the link member 32. When the screw 963 has an outer diameter slightly smaller than an inner diameter of the holes 32a, this can also be realized by inserting a collar slightly thicker than thickness of the hole 32a of the link member 32 and fixing the screw 963 so as to be inserted into the hole 32a of the link member 32 at the collar. Places where the hole and the screw hole are respectively provided may be switched the other way around. It should be noted that since the contents of means for rotatably screwing and the places where the hole and screw hole are provided are also applicable to other members described later, repetitive description will be avoided.

The other end of the portion 321 is fixed rotatably relative to the left and right moving member 31. In the example of FIGS. 12 to 14, a hole 32b passing through the portion 321 in the front and rear direction is formed in the other end. The screw 961 passes through the hole 32b and the long hole 23a and is screwed into the screw hole 31a. The screw 961 loosely passes through the long hole 23a and fixes the link member 32 and the left and right moving member 31 to each other. It should be noted that since the screw 961 is moved in the left and right direction in the long hole 23a, modest rotation of the link member 32 is not prevented.

One end of the portion 322 on the opposite side of the portion 321 is fixed rotatably relative to the joint member 33. In the example of FIGS. 12 to 14, for example, a hole 32c passing through the portion 322 in the front and rear direction is formed in the one end. A screw 964 loosely passes through the hole 32c and is screwed into a screw hole 33b formed in the joint member 33. It should be noted that in the example of FIGS. 12 to 14, the screw 964 also passes through the up and down moving member 20 (portion 23). A long hole 23c is formed in a portion of the portion 23 facing the hole 32c. The long hole 23c has an elongated shape in the up and down direction. The screw 964 loosely passes through the long hole 23c and the hole 32c and is screwed into the screw hole 33b formed in the joint member 33. It should be noted that since the screw 964 can be moved in the up and down direction in the long hole 23c, the movement in the up and down direction of the joint member 33 and the modest rotation of the link member 32 are not prevented. Since the screw 964 screwed into the joint member 33 loosely passes through the link member 32, rotation of the joint member 33 taking the up and down direction as the axis is prevented, and the joint member 33 is moved in the up and down direction by the rotation of the adjustment bolt 82.

With the above structure, the joint member 33 is moved in the up and down direction by the rotation of the adjustment bolt 82, and the one end of the portion 322 rotatably fixed to this is also moved in the up and down direction.

It should be noted that more strictly speaking, while the one end of the portion 322 is moved in the circumferential direction of the hole 32a, the joint member 33 is moved in the up and down direction. Thus, positions of these members can be dissociated. However, for example, since the adjustment bolt 82 is fixed while being allowed to be slightly moved in the left and right direction relative to the bent part 21 or the link member 32 is fixed while being allowed to be slightly moved in the left and right direction (that is, the hole 32c of the link member 32 is a long hole having an elongated shape in the left and right direction), substantial dissociation can be prevented. Since the one end of the portion 322 and the joint member 33 are rotatably fixed to each other, generation of bending stress in the portion 322 and the joint member 33 in accordance with the up and down movement of the joint member 33 can also be prevented. Since these contents are also applicable to fixing of a member moved in the straight line direction and a member moved in the circumferential direction, repetitive description will be omitted.

By such movement in the up and down direction of the joint member 33, that is, the movement in the up and down direction in the one end of the portion 322, the link member 32 is rotated taking the screw 963 as the rotation axis. By such rotation, the other end of the portion 321 imposes the force in the left and right direction onto the left and right moving member 31 through the screw 961. Thereby, the left and right moving member 31 is moved in the left and right direction. By movement of the left and right moving member 31, the force in the left and right direction is imposed onto the stripper bolt 931, and the stripper bolt 931 is moved in the left and right direction. Therefore, based on a rotation amount of the adjustment bolt 82, the thin display device 9 can be moved in the left and right direction relative to the up and down moving member 20, eventually the base plate 10.

Figure 15:
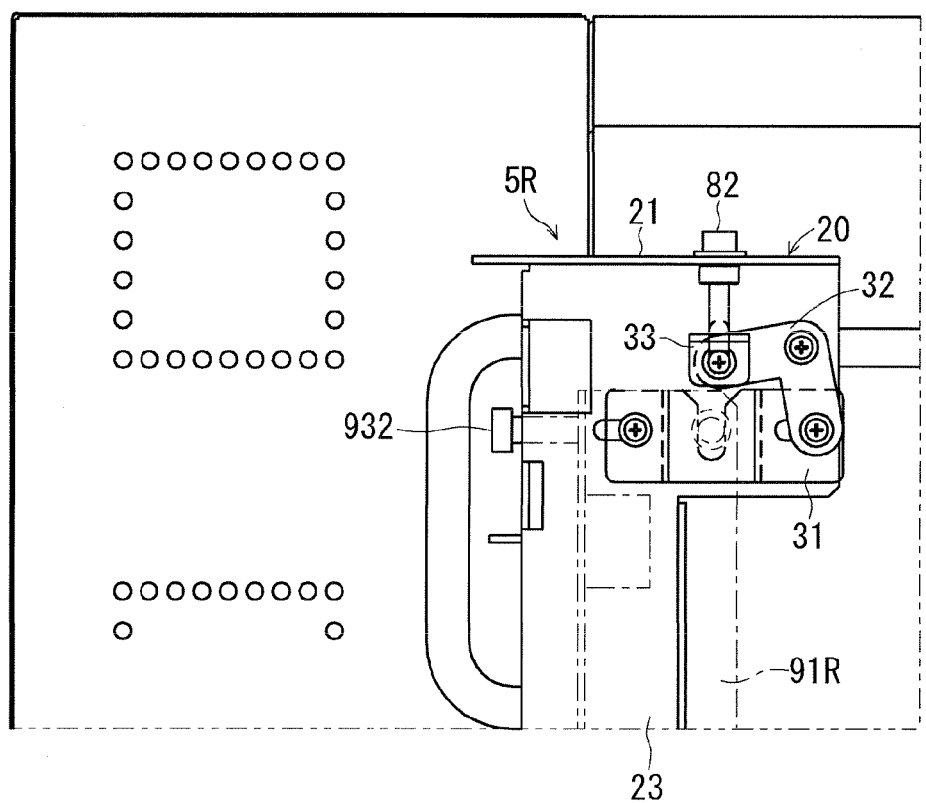
FIG. 15 is a back view showing one conceptual example of the left and right adjustment mechanism.

FIG. 15 shows a state that the adjustment bolt 82 is rotated in the opposite direction to the fastening direction, so that the thin display device 9 is moved leftward (rightward in FIG. 15 as the thin display device is seen from the wall surface side).

It should be noted that the vicinity of a place where the portions 321 and 322 are coupled can be regarded as a rotation axis portion fixed relative the up and down moving member 20 rotatably taking an axis parallel to the front and rear direction as the rotation axis. The one end of the portion 322 can be regarded as the effort point portion onto which force in the up and down direction by the adjustment bolt 82 is imposed, and the other end of the portion 321 can be regarded as the load point portion for imposing the force in the left and right direction onto the thin display device 9.

A distance between the rotation axis and the effort point portion may be longer than a distance between the rotation axis and the load point portion. With this, a movement amount of the left and right moving member 31 becomes smaller than a movement amount of the joint member 33. Thus, fine adjustment in the left and right direction is easily performed. In consideration with the principle of lever, the joint member 33 can be moved in the up and down direction with small force, eventually force required for operation of the adjustment bolt 82 can be reduced. It should be noted that since this content is also applicable to the rotation axis portion, the load point portion, and the effort point portion described later, repetitive description will be omitted.

The link member 32 is not required to have a L shape, but in essence, the link member 32 is only required to be fixed rotatably taking the front and rear direction as the rotation axis (such as the screw 963) relative to the up and down moving member 20, fixed to the left and right moving member 31 in the load point portion displaced in the up and down direction relative to the rotation axis, and fixed to the joint member 33 in the effort point portion displaced in the left and right direction relative to the rotation axis.

Figure 16:
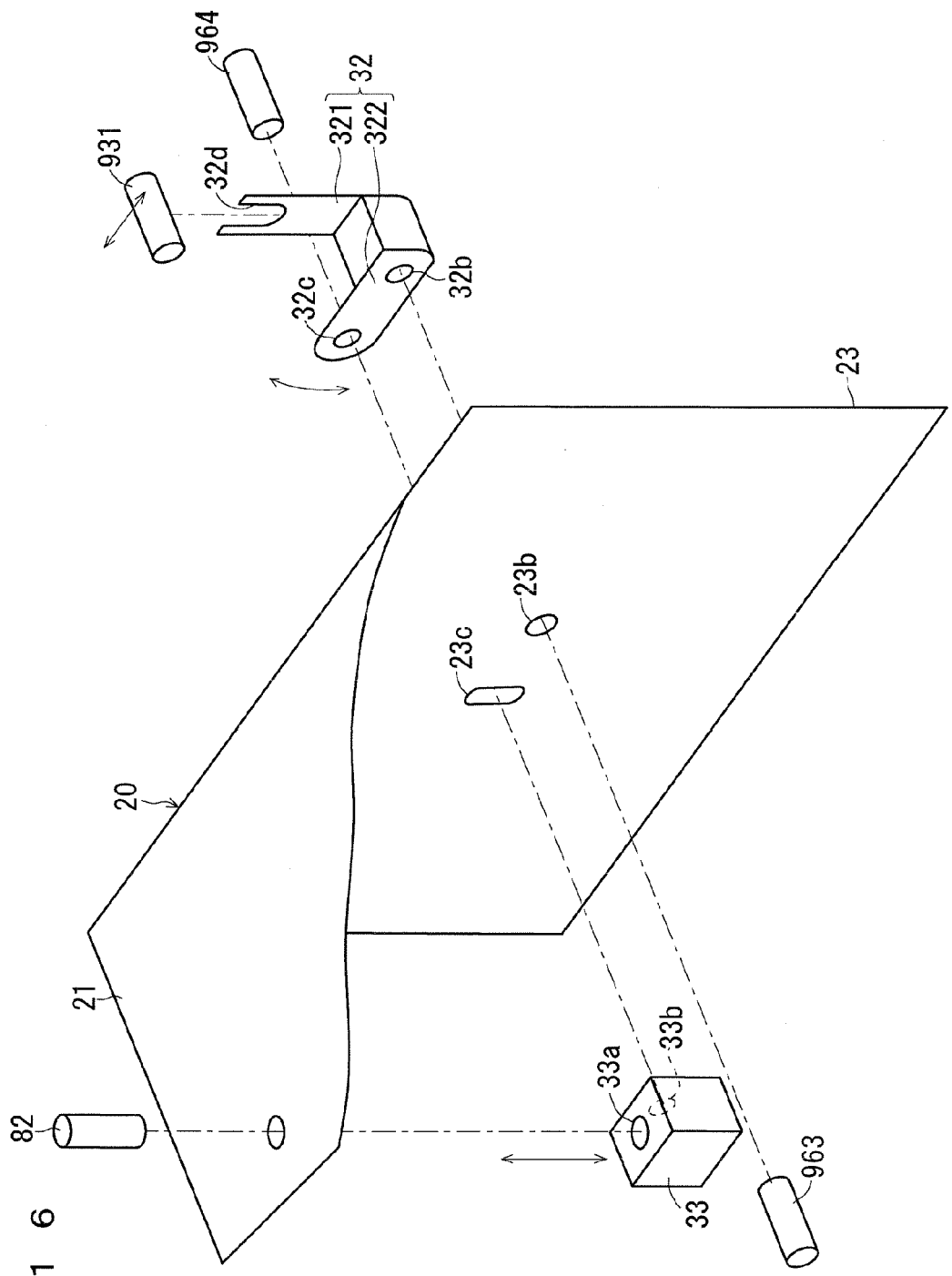
FIG. 16 is an exploded perspective view showing one schematic example of the left and right adjustment mechanism.

The left and right moving member 31 is not an essential requirement. As shown in the example of FIG. 16, the link member 32 may be arranged on the side of the thin display device 9 of the portion 23, and a concave part 32d for nipping the stripper bolt 931 at least in the left and right direction may be formed on the side of the other end of the portion 321 of the link member 32. It should be noted that when the thin display device 9 is attached to the up and down moving member 20 by inserting the stripper bolt 932 into the concave part 20a from the upper side to the lower side, similarly to this, the stripper bolt 931 is desirably inserted into the concave part 32d of the link member 32 from the upper side to the lower side. As shown in the example of FIG. 16, this can be realized by extending the portion 321 upward from the rotation axis (screw 963) and forming the concave part 32d in the one end of the portion 321 on the upper side with this concave part 32d opening upward. With such a structure, the concave part 32d of the link member 32 is also moved in the left and right direction by the rotation of the adjustment bolt 82. Thus, a relative position of the thin display device 9 relative to the up and down moving member 20 can be adjusted in the left and right direction.

It should be noted that the left and right adjustment mechanism may be provided in one of the wall-hanging units 5R and 5L. The other wall-hanging unit may have a structure allowing the movement in the left and right direction of the thin display device 9.

In the above example, the adjustment bolt 82, the joint member 33, and the link member 32 are arranged on the rear side of the portion 23 (wall surface side). Thereby, the number of parts on the front side of the portion 23 can be reduced. Thus, the thin display device 9 is easily attached to the attachment device 1.

The load point portion of the link member 32 may be displaced in the up and down direction and the left and right direction from the rotation axis (screw 963). Even in this case, as long as the up and down moving member is provided, the position of the thin display device 9 can be two-dimensionally adjusted.

(Front and Rear Adjusting Function) Even in a state that the thin display device 9 is supported on the up and down moving member 20, the thin display device can be moved in the front and rear direction. This point will be described along the above example. The four stripper bolts 932 protrude in the left and right direction (also refer to FIG. 5). The four stripper bolts 932 protruding in the left and right direction respectively pass through the up and down moving member 20 in the left and right direction at the concave parts 20a and 20b (also refer to FIG. 9). Length in the front and rear direction of the concave parts 20a and 20b is longer than length (diameter) in the front and rear direction of the columnar parts 932b of the stripper bolts 932. Thus, the stripper bolts 932 can slide at the concave parts 20a and 20b in the front and rear direction so as to be moved. That is, the thin display device 9 can be moved in the front and rear direction. It should be noted that in the above example, the length in the front and rear direction of the concave parts 20a and 20b restricts a movable range in the front and rear direction of the thin display device 9.

Next, a mechanism for imposing the force in the front and rear direction onto the thin display device 9 will be described. For example, the above stripper bolts 932 are utilized as members for imposing the force in the front and rear direction (refer to FIGS. 5 and 6). By respectively moving the four stripper bolts 932 in the front and rear direction, the thin display device 9 is moved in the front and rear direction.

Figure 17:
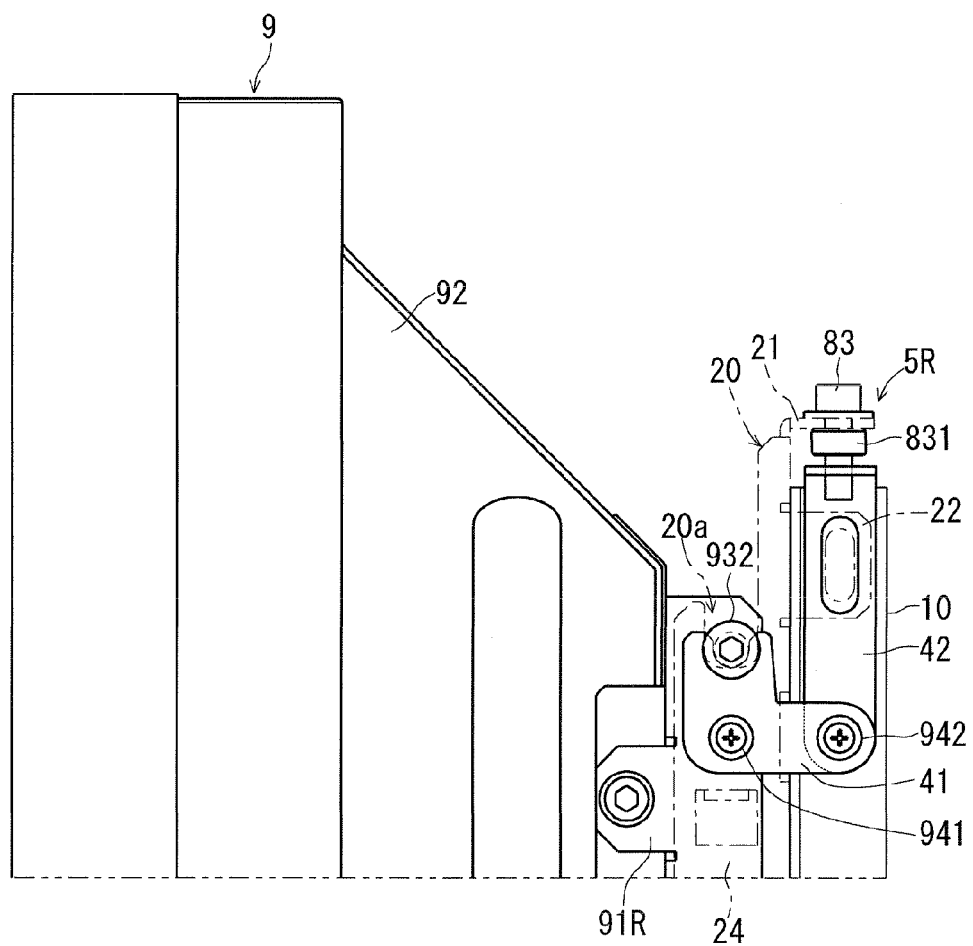
FIG. 17 is a side view showing one conceptual example of a front and rear adjustment mechanism.
Figure 18:
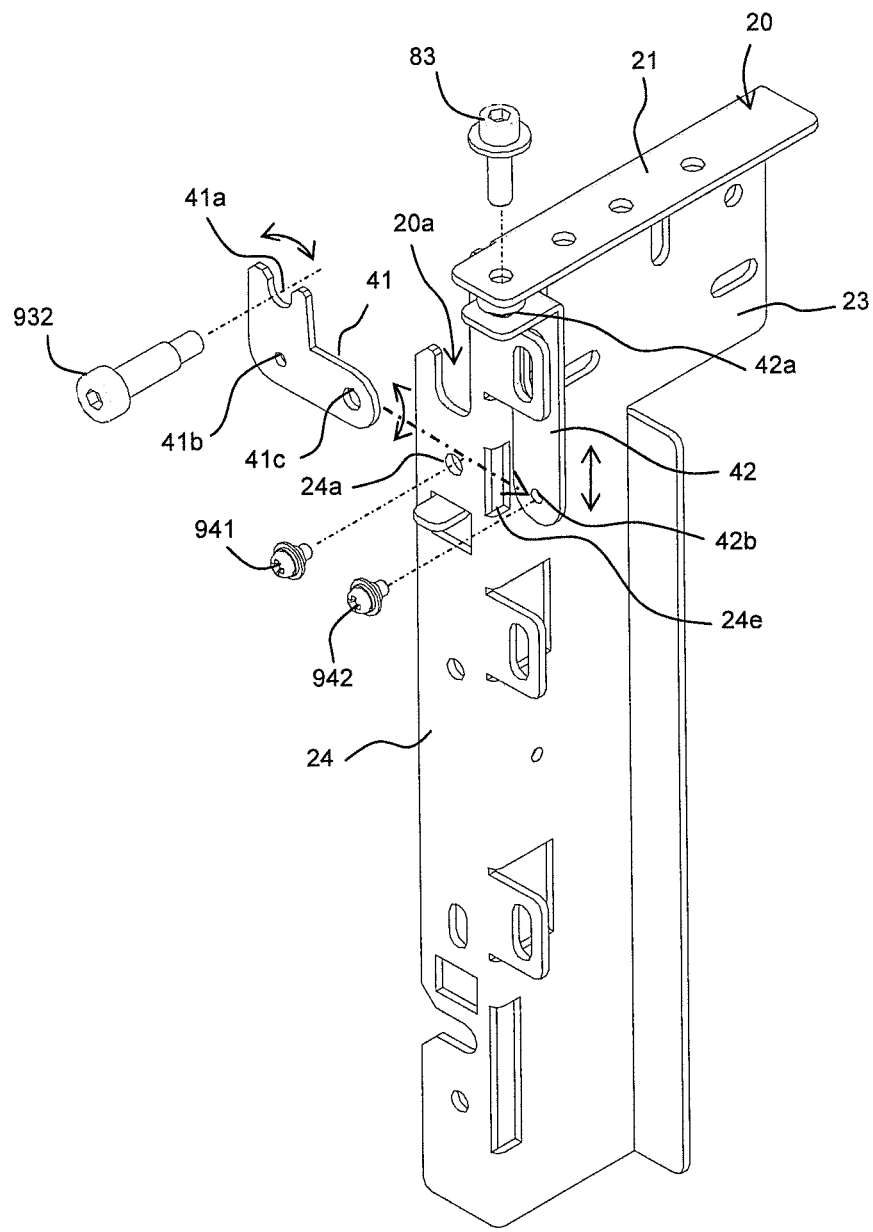
FIG. 18 is an exploded perspective view showing one schematic example of the front and rear adjustment mechanism.

FIG. 17 is a side view showing one example of the front and rear position adjustment mechanism for moving the upper stripper bolt 932 in the front and rear direction. For easy understanding of the structure in the figure, the up and down moving member 20 is shown by a chain line and further transparently indicated. FIG. 18 schematically shows constituent elements of the front and rear adjustment mechanism while broken down into the constituent elements.

The upper stripper bolt 932 is nipped by a front and rear moving member 41 at least in the front and rear direction. In the example of FIGS. 17 and 18, a concave part 41a is formed in an upper portion of the front and rear moving member 41. The concave part 41a opens upward and passes through the front and rear moving member 41 in the left and right direction. The upper stripper bolt 932 is inserted into the concave part 41a and nipped by the front and rear moving member 41 in the front and rear direction. By moving such a concave part 41a in the front and rear direction, the force in the front and rear direction is imposed onto the upper stripper bolt 932. Eventually, the thin display device 9 is moved in the front and rear direction in the upper portion thereof.

An operating part 83 for moving the concave part 41a in the front and rear direction is operated from the same direction (upper side) as the operating part 81. In the example of FIGS.

17 and 18, a male screw member serving as one example of the operating part 83 (hereinafter, called as the adjustment bolt 83) is provided in the bent part 21. A hole passing through the bent part in the up and down direction is provided in the bent part 21, and the adjustment bolt 83 passes through such a hole of the bent part 21 from the upper side to the lower side. The adjustment bolt 83 is rotatable relative to the bent part 21. A positioning member 831 for deciding a position in the up and down direction of the adjustment bolt 83 relative to the up and down moving member 20 is provided. Since this point is the same as the adjustment bolt 81 and the positioning member 811, detailed description will be omitted.

The adjustment bolt 83 is screwed into a screw hole 42a formed in a joint member 42. Since the joint member 42 is not rotated taking the up and down direction as an axis as described later, a distance between the bent part 21 and the joint member 42 is adjusted by rotation of the adjustment bolt 83. That is, the joint member 42 can be moved in the up and down direction relative to the up and down moving member 20.

The front and rear moving member 41 has a function of moving the concave part 41a in the front and rear direction in accordance with movement in the up and down direction of the joint member 42. That is, the front and rear moving member 41 is fixed to the up and down moving member 20 rotatably on a rotation axis displaced in the up and down direction from the concave part 41a, the rotation axis being perpendicular to the up and down direction and the front and rear direction (parallel to the left and right direction). In the example of FIGS. 17 and 18, a screw hole 41b is formed on the lower side of the concave part 41a of the front and rear moving member 41. Meanwhile, a hole 24a is formed in a portion of the portion 24 serving as a side surface of the up and down moving member 20 in which the concave part 20a is formed, the portion facing the screw hole 41b in the left and right direction. The hole 24a passes through the portion 24 in the left and right direction. A screw 941 loosely passes through the hole 24a and is screwed into the screw hole 41b. Thereby, the front and rear moving member 41 is fixed rotatably taking the screw 941 as the rotation axis relative to the portion 24.

The front and rear moving member 41 is fixed rotatably on a rotation axis displaced in the front and rear direction from the rotation axis (the screw 941) relative to the joint member 42, the rotation axis being parallel to the left and right direction. In the example of FIGS. 17 and 18, a hole 41c passing through the front and rear moving member 41 in the left and right direction is formed in a portion of the front and rear moving member 41 positioned on the wall surface side of the screw hole 41b. Meanwhile, a screw hole 42b is formed in a portion of the joint member 42 facing the hole 41c in the left and right direction. A screw 942 loosely passes through the hole 41c and is screwed into the screw hole 42b. It should be noted that with such a configuration, the joint member 42 is not rotated taking the up and down direction as the axis, but moved in the up and down direction by the rotation of the adjustment bolt 83.

With such a structure, the front and rear moving member 41 is rotated taking the screw 941 as the rotation axis by the movement in the up and down direction of the joint member 42. The concave part 41a is moved in the front and rear direction by such rotation. Therefore, based on a rotation amount of the adjustment bolt 83, the upper stripper bolt 932, that is, the thin display device 9 can be moved in the front and rear direction relative the up and down moving member 20 in the upper portion thereof.

Figure 19:
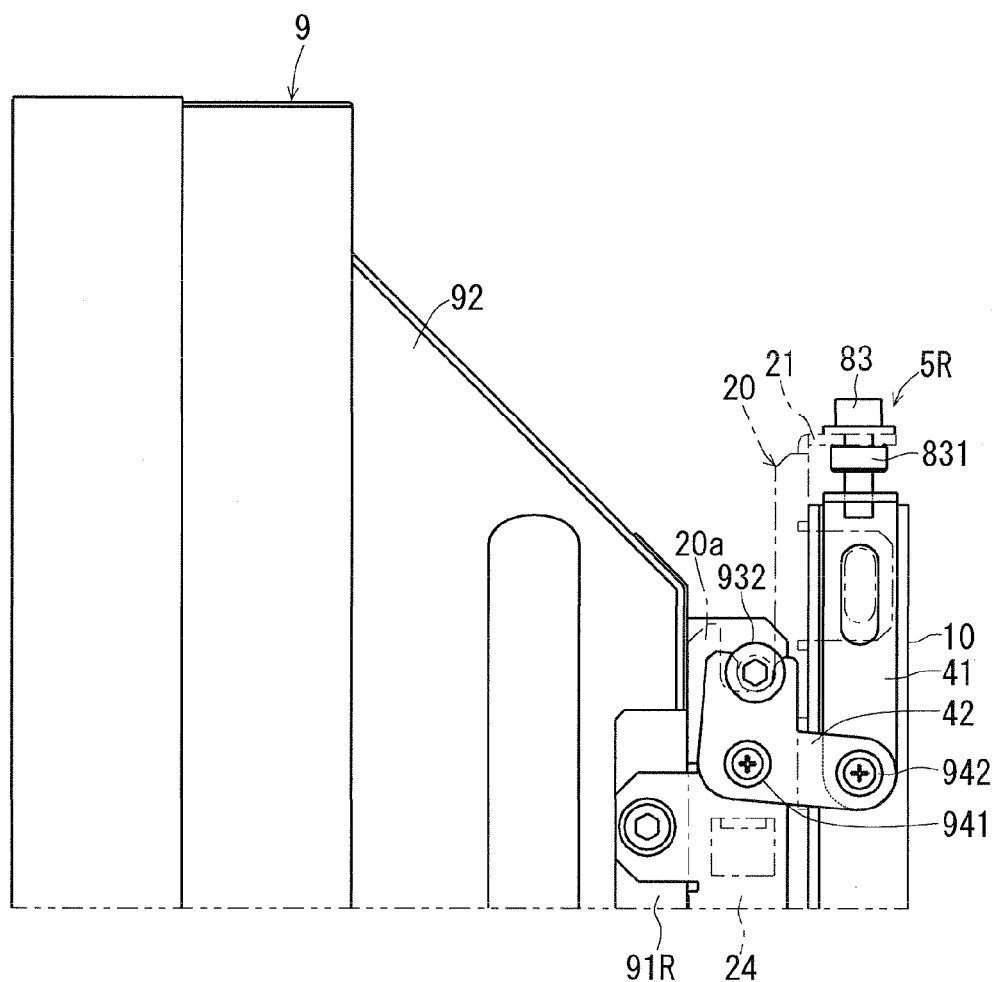
FIGS. 19 and 20 are side views each showing one conceptual example of a front and rear adjustment mechanism.

FIG. 19 shows a state that the adjustment bolt 83 is rotated in the opposite direction to the fastening direction, so that the thin display device 9 is moved toward the wall surface side in the front and rear direction.

It should be noted that regarding the front and rear moving member 41, the vicinity of the screw hole 41b can be regarded as the rotation axis portion, the vicinity of the concave part 41a can be regarded as the effort point portion, and the vicinity of the screw hole 41c can be regarded as the load point portion.

In the example of FIGS. 17 and 18, the joint member 42 is fixed movably in the up and down direction relative to the up and down moving member 20. In more detail, a long hole 42c passing through the joint member 42 in the left and right direction and having an elongated shape in the up and down direction is formed in the joint member 42. The screw 95 loosely passes through the long hole 22a formed in the fixing portion 22 of the up and down moving member 20 and the long hole 42c and is screwed into the base plate 10. Thereby, while ensuring the movement in the up and down direction of the joint member 42, the fixing force can be improved.

In the above example, the adjustment bolt 83 and the joint member 42 are arranged on the rear side of the portion 23 (wall surface side). Thereby, the number of parts on the front side of the portion 23 can be reduced. Thus, the thin display device 9 is easily attached to the attachment device 1. In this case, the front and rear moving member 41 is in contact with the stripper bolt 932 and the joint member 42 arranged in different spaces from each other taking the portion 23 as a border. Thus, for example, a cutout 24e through which the front and rear moving member 41 loosely passes in the front and rear direction is provided in the portion 23.

Figure 20:
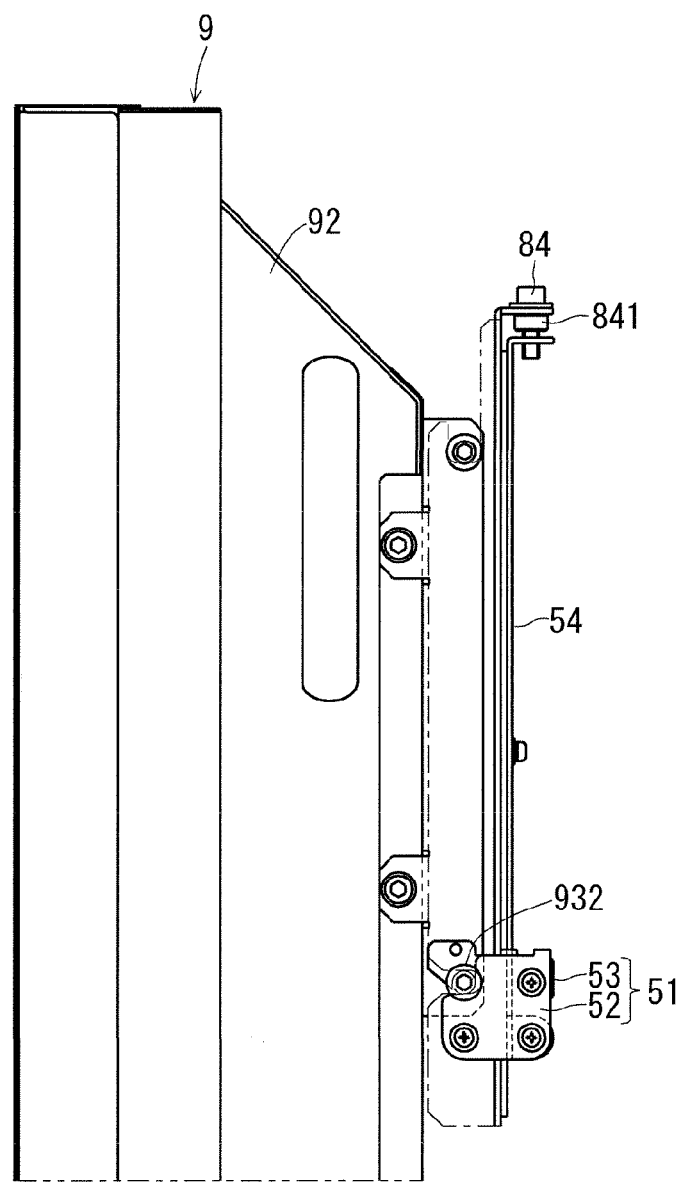
Figure 21:
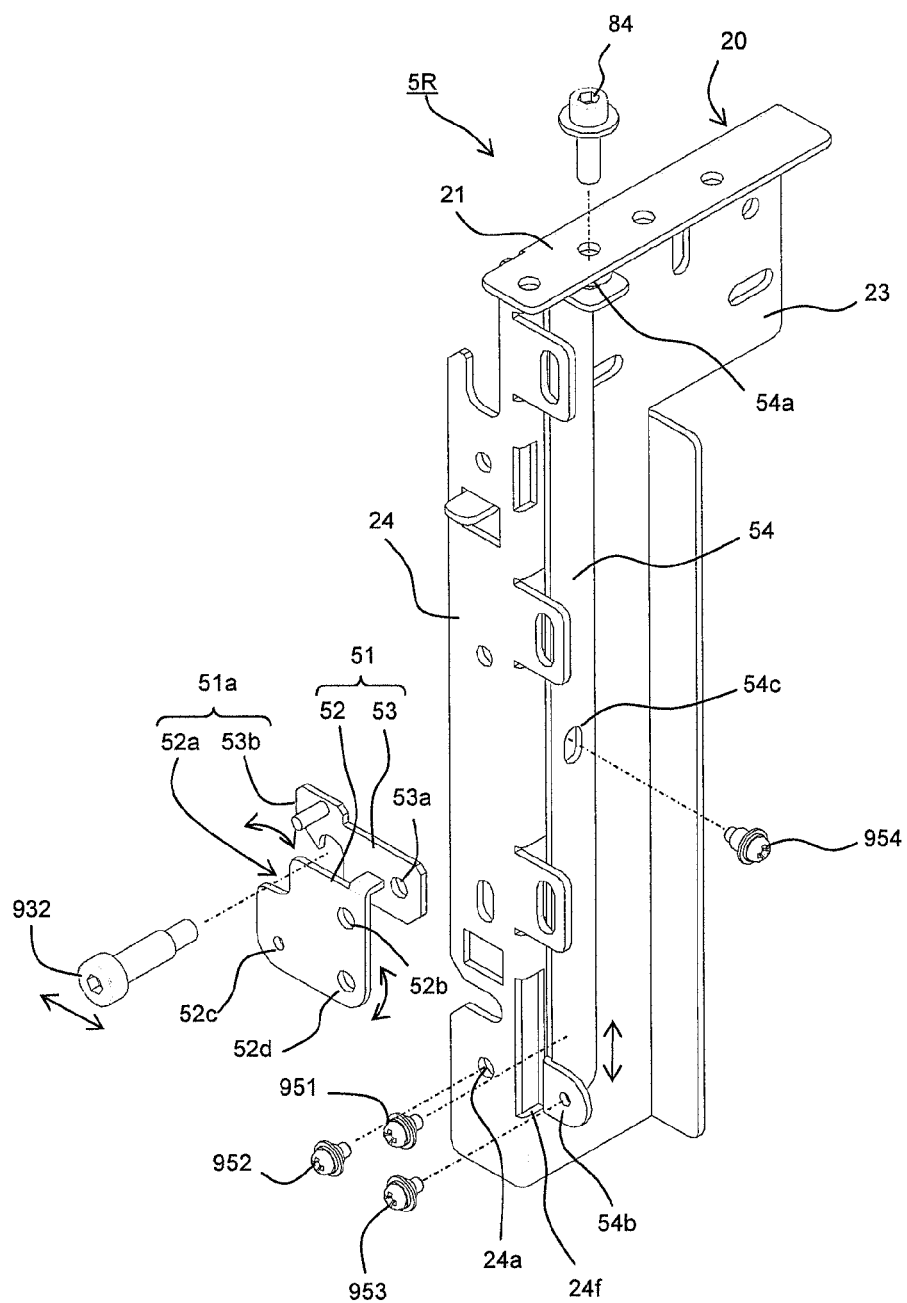
FIG. 21 is an exploded perspective view showing one schematic example of the front and rear adjustment mechanism.

FIG. 20 is a side view showing one example of a front and rear position adjustment mechanism for moving the lower stripper bolt 932 in the front and rear direction. For easy understanding of the structure in the figure, the up and down moving member 20 is shown by a chain line and transparently indicated. FIG. 21 schematically shows constituent elements of the front and rear adjustment mechanism while breaked down into the constituent elements.

The lower stripper bolt 932 is nipped by a front and rear moving member 51 at least in the front and rear direction. It should be noted that the lower stripper bolt 932 is inserted into the concave part 20b of the up and down moving member 20 along the front and rear direction in the above example of the attachment. Thus, the front and rear moving member 51 does not disturb such insertion, and nips the stripper bolt 932 in the front and rear direction after the insertion of this stripper bolt. In order to realize such a function, the front and rear moving member 51 is provided with a rotation member 52 and a locking member 53 in the example of FIGS. 20 and, 21.

In the example of FIGS. 20 and 21, the rotation member 52 has a shape in which a smaller square portion is taken off from one corner of a square plate. The lower stripper bolt 932 is arranged in a level difference part 52a of this taken-off portion forming a level difference.

The locking member 53 is fixed rotatably on a rotation axis relative to the rotation member 52. The rotation axis is positioned on the wall surface side of the level difference part 52a and is perpendicular to the up and down direction and the front and rear direction (parallel to the left and right direction). For example, a hole 52b is formed in the rotation member 52 on the wall surface side of the level difference part 52a. The hole 52b passes through the rotation member 52 in the left and right direction. A screw hole 53a is formed in a portion of the locking member 53 facing the hole 52b in the left and right direction. A screw 951 loosely passes through the hole 52b and is screwed into the screw hole 53a. Thereby, the locking member 53 is fixed rotatably relative to the rotation member 52.

The locking member 53 has a claw part 53b positioned on the side of the thin display device 9 with relative to the stripper bolt 932. In the example of FIGS. 20 and 21, the locking member 53 is extended from the screw hole 53a toward the side of the thin display device 9 over the stripper bolt 932, and has the claw part 53b on the side of the thin display device 9 with relative to the stripper bolt 932.

Figure 22:
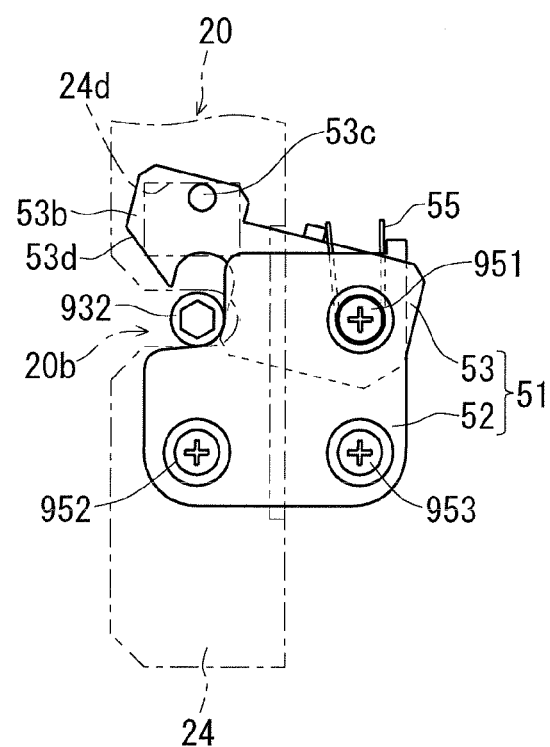
FIG. 22 is a side view showing a state that locking to the thin display device is cancelled.

When the locking member 53 is rotated relative to the rotation member 52, as shown in FIG. 22, the claw part 53b can be moved upward relative to the stripper bolt 932. In such a state, the stripper bolt 932 is released forward (toward the side of the thin display device 9). That is, forward movement of the stripper bolt 932 is allowed. Meanwhile, in a state that the stripper bolt 932 is inserted into the concave part 20b, when the locking member 53 is rotated relative to the rotation member 52 so that the claw part 53b is moved downward, the rotation member 52 and the locking member 53 work together at predetermined rotation positions, so as to nip the stripper bolt 932 in the front and rear direction. It should be noted that the locking member 53 may have a shape of nipping the stripper bolt 932 and the stripper bolt 932 may be nipped only by the locking member 53.

When the stripper bolt 932 is inserted into the concave part 20b, the stripper bolt 932 is brought into contact with the claw part 53b from the side of the thin display device 9 to desirably move the claw part 53b upward. This can be realized by providing for example a tilt part, 53d tilted when seen from the left and right direction on a side surface on the side of the thin display device 9 of the claw part 53b.

As described above, the front and rear moving member 51 does not disturb the insertion of the stripper bolt 932 into the concave part 20b but nips the stripper bolt 932 in the front and rear direction. By moving a portion 51a for nipping this stripper bolt 932 (in the example of FIGS. 20 and 21, the level difference part 52a and the claw part 53b) in the front and rear direction, the stripper bolt 932 is moved in the front and rear direction.

An operating part 84 for moving the portion 51a in the front and rear direction is operated from the same direction (upper side) as the operating part 81. In the example of FIGS. 20 and 21, a male screw member serving as one example of the operating part 84 (hereinafter, called as the adjustment bolt 84) is provided in the bent part 21. A hole passing through the bent part in the up and down direction is provided in the bent part 21, and the adjustment bolt 84 passes through such a hole of the bent part 21 from the upper side to the lower side. The adjustment bolt 84 is rotatable relative to the bent part 21. A positioning member 841 for deciding a position in the up and down direction of the adjustment bolt 84 relative to the up and down moving member 20 is provided. Since this point is the same as the adjustment bolt 81 and the positioning member 811, detailed description will be omitted.

The adjustment bolt 84 is screwed into a screw hole 54a formed in a joint member 54. Since the joint member 54 is not rotated taking the up and down direction as an axis as described later, a distance between the bent part 21 and the joint member 54 is adjusted by rotation of the adjustment bolt 84. That is, the joint member 54 is moved in the up and clown direction relative to the up and down moving member 20.

The front and rear moving member 51 has a function of moving the portion 51a in the front and rear direction in accordance with movement in the up and down direction of the joint member 54. That is, the front and rear moving member 51 is fixed to the up and down moving member 20 rotatably on a rotation axis at a position displaced in the up and down direction from the portion 51a, the rotation axis being perpendicular to the up and down direction and the front and rear direction (parallel to the left and right direction). In the example of FIGS. 20 and 21, a screw hole 52c is formed in a portion of the rotation member 52 on the lower side of the level difference part 52a. Meanwhile, a hole 24a is formed in a portion of the portion 24 of the up and down moving member 20 facing the screw hole 52c in the left and right direction. The hole 24a passes through the portion 24 in the left and right direction. A screw 952 loosely passes through the hole 24a and is screwed into the screw hole 52c. Thereby, the front and rear moving member 51 is fixed rotatably taking the screw 952 as the rotation axis relative to the portion 24.

The front and rear moving member 51 is fixed rotatably on a rotation axis relative to the joint member 54, the rotation axis displaced in the front and rear direction from the screw 952 and being parallel to the left and right direction. In the example of FIGS. 20 and 21, a hole 52d is formed in the rotation member 52 on the wall surface side of the screw hole 52c. The hole 52d passes through the rotation member 52 in the left and right direction. A screw hole 54b is formed in a portion of the joint member 54 facing the hole 52d in the left and right direction. A screw 953 loosely passes through the hole 52d and is screwed into the screw hole 54b. It should be noted that by such fixing, the joint member 54 is not rotated taking the up and down direction as the axis, but moved in the up and down direction by the rotation of the adjustment bolt 84.

With such a structure, the front and rear moving member 51 is rotated taking the screw 952 as the rotation axis by the movement in the up and down direction of the joint member 54. The portion 51a is moved in the front and rear direction by such rotation. Therefore, based on a rotation amount of the adjustment bolt 84, the lower stripper bolt 932, that is, the thin display device 9 can be moved in the front and rear direction relative the up and down moving member 20 in a lower portion thereof.

Figure 23:
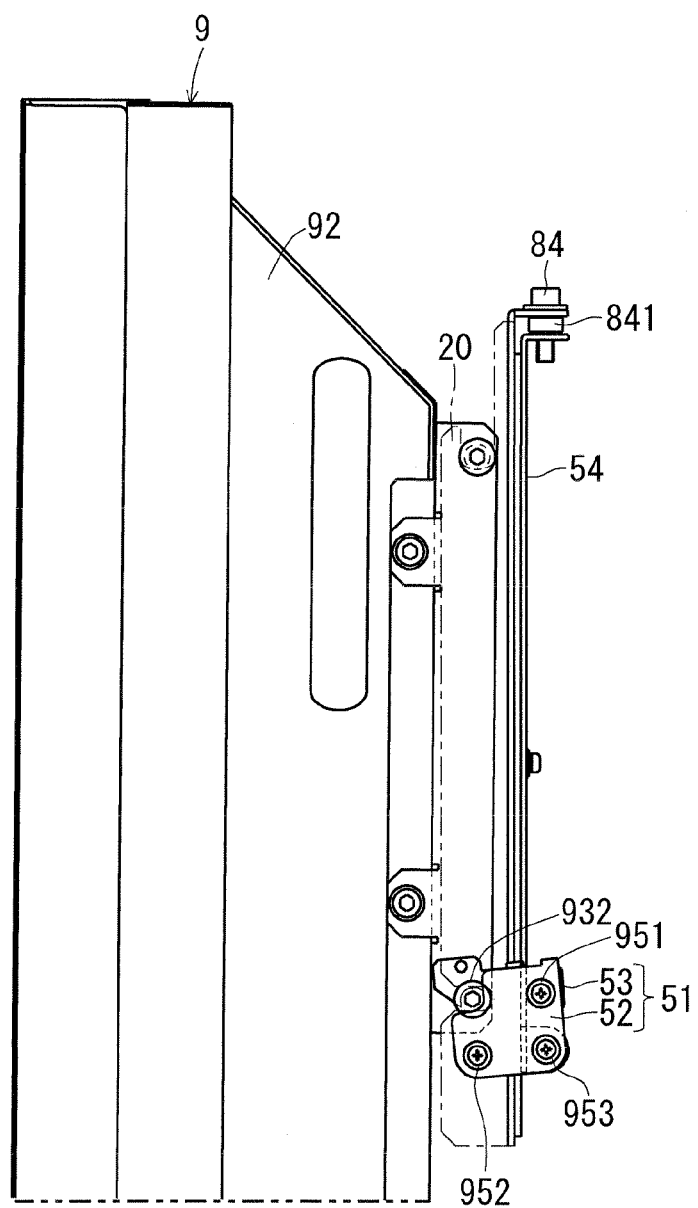
FIG. 23 is a side view showing one conceptual example of the front and rear adjustment mechanism.

FIG. 23 shows a state that the adjustment bolt 84 is rotated in the fastening direction, so that the thin display device 9 is moved toward the opposite side to the wall surface in the front and rear direction in the lower portion thereof.

It should be noted that regarding the front and rear moving member 51, the vicinity of the screw hole 52c can be regarded as the rotation axis portion, the vicinity of the portion 51a can be regarded as the effort point portion, and the vicinity of the screw hole 52d can be regarded as the load point portion.

In the example of FIGS. 20 and 21, the joint member 54 is fixed movably in the up and down direction relative to the up and down moving member 20. In more detail, a long hole 54c passing through the joint member 54 in the front and rear direction and having an elongated shape in the up and down direction is formed in the joint member 54. A screw hole 23d is formed in a portion of the portion 23 of the up and down moving member 20 facing the long hole 54c. A screw 954 loosely passes through the long hole 54c and is screwed into the screw hole 23d. Thereby, while ensuring the movement in the up and down direction of the joint member 54, the fixing force can be improved.

In the above example, the adjustment bolt 84 and the joint member 54 are arranged on the rear side of the portion 23 (wall surface side). Thereby, the number of parts on the front side of the portion 23 can be reduced. Thus, the thin display device 9 is easily attached to the attachment device 1. In this case, the front and rear moving member 51 is in contact with the stripper bolt 932 and the joint member 54 arranged in different spaces from each other taking the portion 23 as a border. Thus, for example, a cutout 24f through which the front and rear moving member 51 loosely passes in the front and rear direction is provided in the portion 23.

The wall-hanging unit 5L also has the front and rear adjustment mechanisms for moving the upper and lower stripper bolts 932 in the front and rear direction as well as the wall-hanging unit 5R. Thus, the thin display device 9 can be adjusted in the front and rear direction at four points. When the thin display device 9 is moved in the front and rear direction by the same amount in the same direction at all these four points, the thin display device 9 can be moved in parallel in the front and rear direction. Thus, when the up and down adjustment mechanism and the left and right adjustment mechanism are provided, the thin display device 9 can be three-dimensionally adjusted.

When for example, the thin display device 9 is moved by the different amount or in the different direction at each of the four points, a tilt of the thin display device 9 when seen from the left and right direction or the up and down direction can be adjusted. It should be noted that when a function of adjusting the tilt when seen from the up and down direction is not required, for example, the front and rear moving members 41 and 51 are not necessarily arranged side by side when seen from the up and down direction. In this case, the front and rear moving member is only required to be provided in the vicinity of a gravity center of the thin display device 9 when seen from the up and down direction. When the tilt when seen from the left and right direction is not required to be adjusted, the front and rear moving members 41 and 51 are not necessarily arranged side by side when seen from the left and right direction. In this case, the front and rear moving member is only required to be provided in the vicinity of a gravity center of the thin display device 9 when seen from the left and right direction.

It should be noted that the front and rear moving members 41 and 51 can be regarded to move the thin display device 9 in the direction crossing a plane including the up and down direction and the left and right direction. It should be noted that the front and rear moving members 41 and 51 are not necessarily moved in the front and rear direction. In other words, the front and rear moving members may be fixed rotatably relative to the up and down moving member 20 so that the rotation axes of the front and rear moving members 41 and 51 cross the plane. The load point portions of the front and rear moving members 41 and 51 may be displaced in the up and down direction and the front and rear direction from these rotation axes. Even in this case, when the up and down movement mechanism and the left and right movement mechanism are provided, the position of the thin display device 9 can be three-dimensionally adjusted.

Since the front and rear moving member 51 serves both a function of locking the lower stripper bolt 932 and a function of moving the lower stripper bolt 932 in the front and rear direction, the number of parts can be reduced.

(Locking and Removal of Lower Stripper Bolt) As described with reference to the example of FIGS. 20 to 22, the lower stripper bolt 932 is locked by the claw part 53b. In order to maintain this state more reliably, in a state that the stripper bolt 932 is inserted into the concave part 20b, the claw part 53b is desirably biased downward. In order to realize this, in the example of FIG. 22, an elastic member 55 is provided between the rotation member 52 and the locking member 53. The elastic member 55 is for example a torsion coil spring. It should be noted that a coil portion thereof does not necessarily make a loop but may have a U shape. The elastic member 55 is arranged between the rotation member 52 and the locking member 53 so that the coil portion surrounds and covers the screw 951, one end thereof is supported on the rotation member 52, and the other end thereof is supported on the locking member 53. The elastic member 55 imposes force in the direction in which the one end and the other end extend. Thereby, elastic force of biasing the claw part 53b downward is imposed onto the rotation member 52 and the locking member 53.

Meanwhile, when a function of moving the claw part 53b upward is not provided, removal of the stripper bolt 932 is difficult. Thus, next, a locking cancellation mechanism capable of easily moving the claw part 53b upward will be described.

Figure 24:
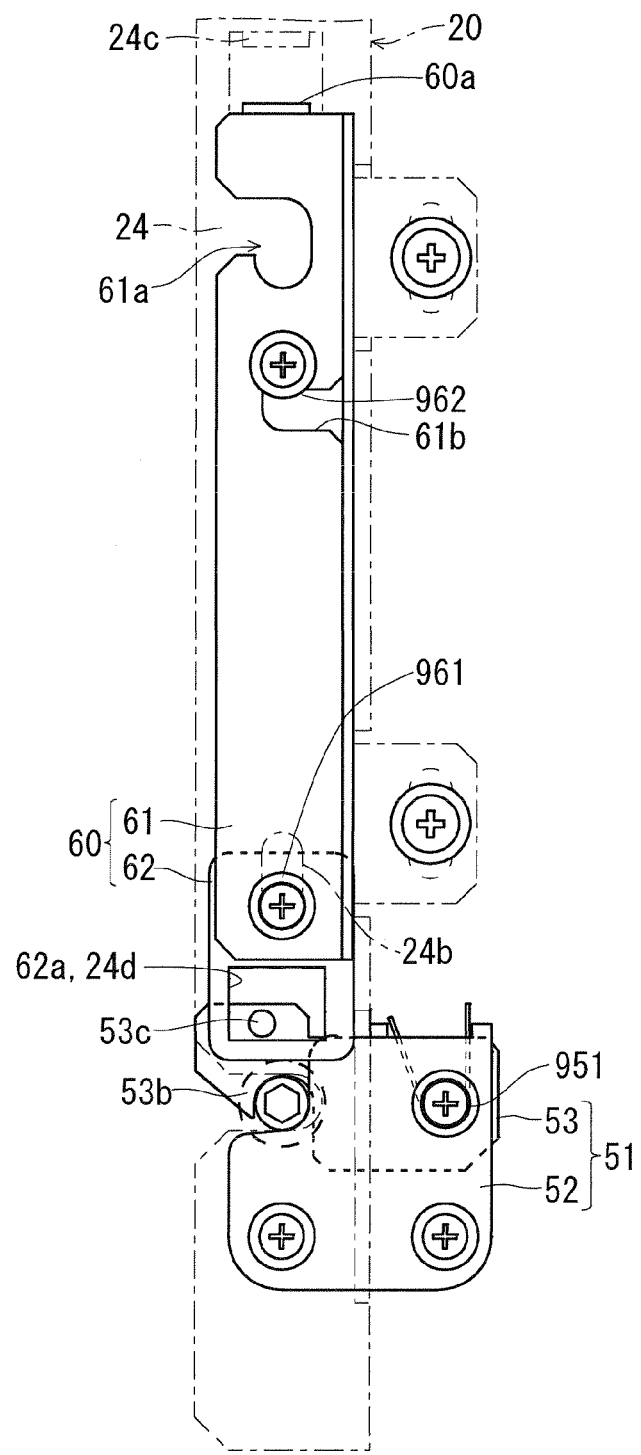
FIGS. 24 and 25 are side views showing one conceptual example of a cancellation mechanism for cancelling the locking to the thin display device.

FIG. 24 is a side view showing one example of the locking cancellation mechanism. However, the up and down moving member 20 is shown by a chain line and transparently indicated. Parts other than a mechanism for removing the lower stripper bolt 932 are omitted from the figure.

A protruding part 53c protruding along the left and right direction is provided in the locking member 53. By moving such a protruding part 53c upward, the claw part 53b is moved upward. In the example of FIG. 24, the protruding part 53c is provided on the upper side of the claw part 53b. The protruding part 53c is extended while passing through the up and down moving member 20 (portion 24) in the left and right direction. A hole 24d formed in the portion 24, the hole through which the protruding part 53c passes, has so sufficient size that the protruding part 53c is moved until the claw part 53b is removed from the stripper bolt 932.

With such a structure, the user or the operator can grip the protruding part 53c from the left and right direction and easily lift this upward. Therefore, the claw part 53b is moved upward and the locking of the lower stripper bolt 932 is cancelled.

It should be noted that in the example of FIG. 24, the user does not directly operate the protruding part 53c but can move the protruding part 53c upward through a cancellation lever 60. Thus, next, an overview of the cancellation lever 60 will be described. The cancellation lever 60 is fixed movably in the up and down direction relative to the up and down moving member 20 (in more detail, the portion 24). The cancellation lever 60 has a structure of catching the protruding part 53c from the lower side. In the example of FIG. 24, a hole 62a through which the protruding part 53c passes is formed in the cancellation lever 60. Meanwhile, the cancellation lever 60 has a protruding part 60a protruding outward along the left and right direction in an upper portion thereof. A protruding part 24c protruding outward along the left and right direction is provided in the portion 24 on the upper side of the protruding part 60a.

Figure 25:
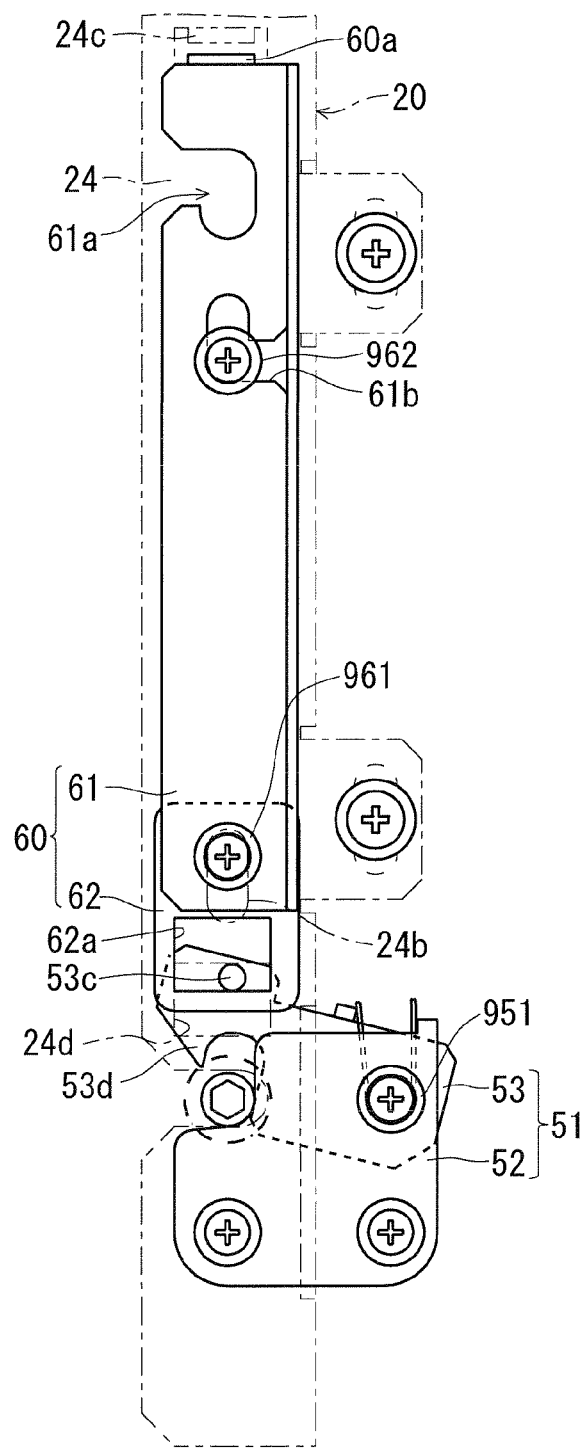

With such a structure, when the protruding parts 24c and 60a are nipped by fingers and brought close to each other, the cancellation lever 60 can be moved upward relative to the up and down moving member 20. In accordance with such movement, the protruding part 53c is moved upward, and the locking of the stripper bolt 932 by the claw part 53b is cancelled. FIG. 25 shows one example of a case where the cancellation lever 60 is moved upward relative to the up and down moving member 20.

(Tilt Mechanism) With the example of FIGS. 24 and 25, by utilizing the cancellation lever 60, the thin display device 9 can be fixed in tilted posture. Hereinafter, one more detailed example will be described with reference to the example of FIGS. 24 and 25.

The cancellation lever 60 has an upper member 61 and a lower member 62. Both the upper member 61 and the lower member 62 are fixed movably in the up and down direction relative to the up and down moving member 20.

Figure 26:
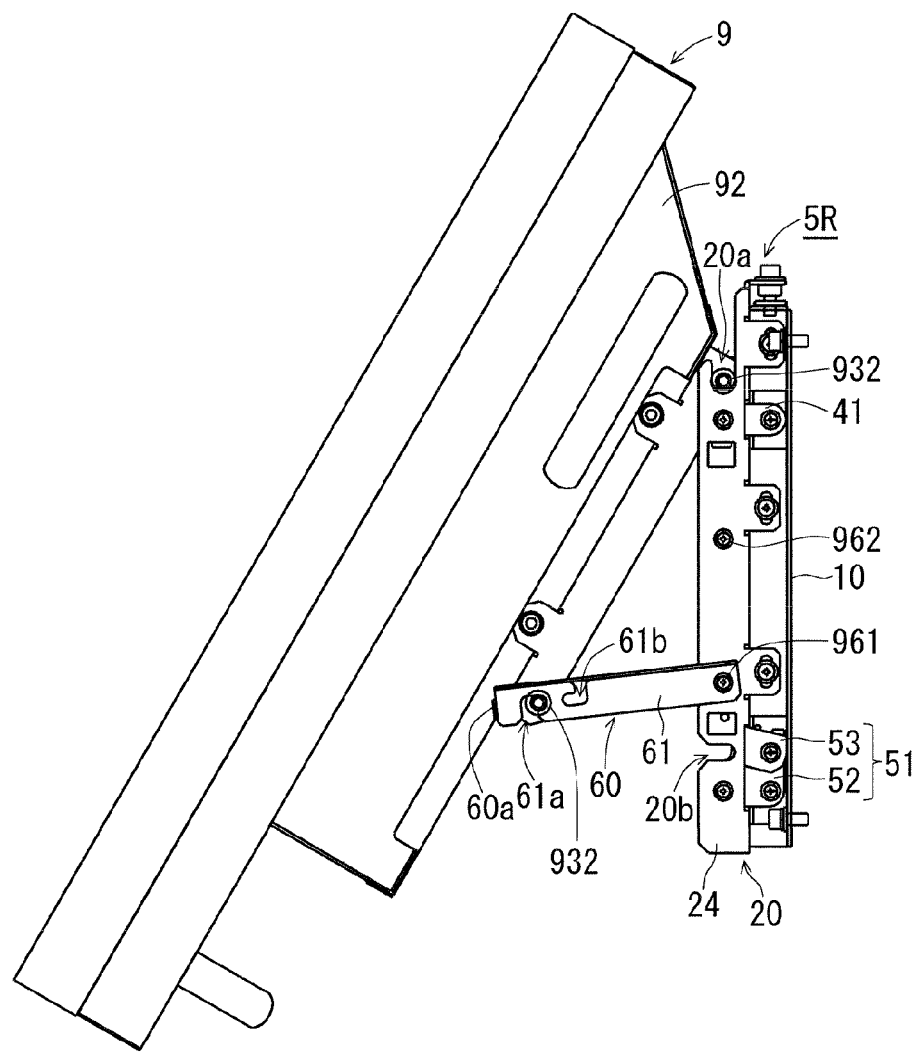
FIG. 26 is a side view showing a state that the thin display device is obliquely supported.
Figure 27:
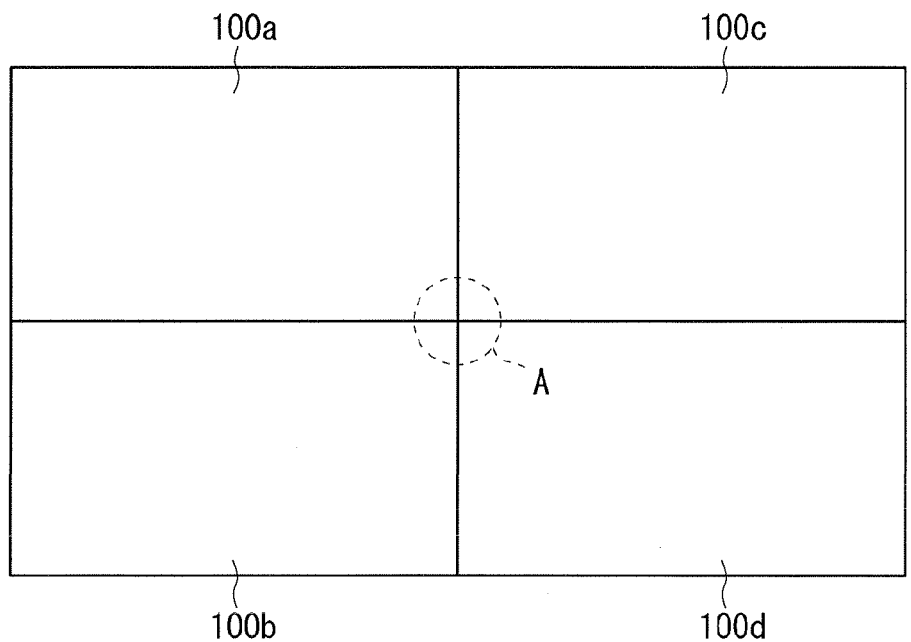
FIG. 27 is a front view showing one schematic example of display devices arranged with multi-tiling.
Figure 28:
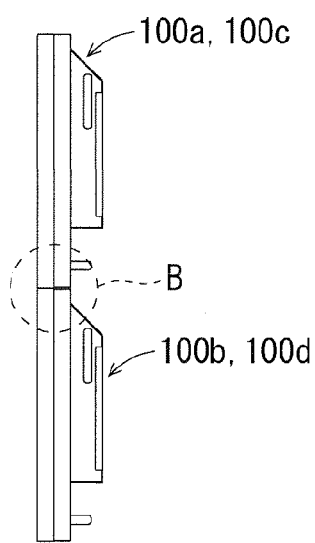
FIG. 28 is a side view showing one schematic example of the display devices arranged with the multi-tiling.
Figure 29:
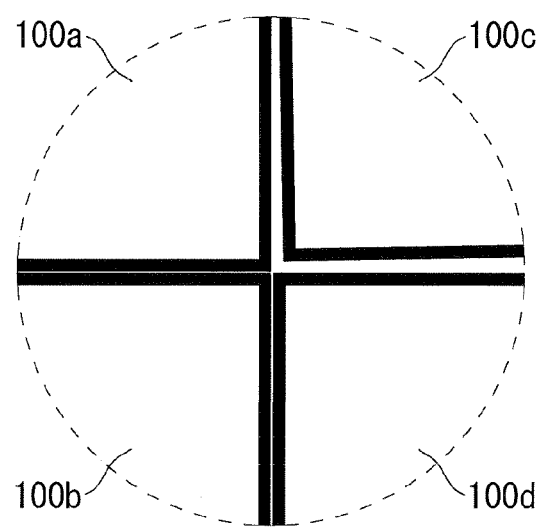
FIG. 29 is an enlarged view showing part of FIG. 27.
Figure 30:
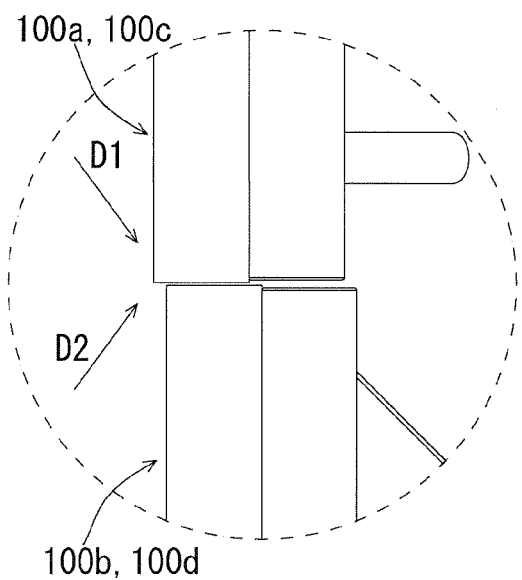
FIG. 30 is an enlarged view showing part of FIG. 28.

In a state that the cancellation lever 60 is moved upward, the lower member 62 lifts the locking member 53 upward and releases the stripper bolt 932 forward. In the example of FIGS. 25 and 26, the lower member 62 has the hole 62a through which the protruding part 53c passes in the left and right direction.

In a state that the cancellation lever 60 is moved upward, the upper member 61 is pivotable forward (toward the side of the thin display device 9) relative to the lower member 62. Hereinafter, one detailed example of a structure of realizing fixing of the upper member 61 and the lower member 62 movably in the up and down direction and pivot of the upper member 61 will be described.

In the example of FIGS. 24 and 25, holes respectively passing through the upper member and the lower member in the left and right direction are respectively formed in the upper member 61 and the lower member 62. The hole formed in the lower member 62 is a screw hole. The upper member 61 is arranged on the outer side in the left and right direction of the portion 24, and the lower member 62 is arranged on the inner side of the portion 24. Meanwhile, for example, a long hole 24b is formed in the portion 24. The long hole 24b has an elongated shape in the up and down direction. The screw 961 passes through the hole of the upper member 61 and the long hole 24b and is screwed into the screw hole of the lower member 62. With such a structure, the upper member 61 is fixed pivotably relative to the lower member 62. Furthermore, within a range where the screw 961 can be moved in the up and down direction in the long hole 24b, the cancellation lever 60 (the upper member 61 and the lower member 62) can be moved in the up and down direction relative to the up and down moving member 20.

Since the upper member 61 is pivotable relative to the lower member 62, a position in the pivot circumferential direction of the upper member 61 is required to be fixed. In the example of FIGS. 24 and 25, the portion 24 has a protruding part 962 protruding outward in the left and right direction. The protruding part 962 is for example a screw (hereinafter, called as the screw 962). The screw 962 is screwed to the portion 24 in posture of protruding outward in the left and right direction. Meanwhile, a hole 61b locked to the screw 962 is formed in the upper member 61. The hole 61b passes through the upper member 61 in the left and right direction and has a L shape when seen from the left and right direction. In more detail, the hole 61b opens on the wall surface side, and is extended from this opening part toward the side of the thin display device 9, and successively bent and extended upward. The screw 962 is nipped in the front and rear direction in the hole 61b in a state that the cancellation lever 60 is positioned on the lower side (refer to FIG. 24). Thus, in this state, the position in the pivot circumferential direction of the upper member 61 taking the screw 962 as a rotation axis is fixed. Meanwhile, in a state that the cancellation lever 60 is positioned on the upper side, the screw 962 is released on the wall surface side (refer to FIG. 25). Therefore, in this state, the upper member 61 is pivotable toward the side of the thin display device 9 relative to the lower member 62.

As shown in the example of FIG. 26, the upper member 61 has a locking part 61a for locking the lower stripper bolt 932 in a state that the lower stripper bolt 932 is drawn from the concave part 20b and the thin display device 9 is obliquely lifted. In more detail, also with reference to FIGS. 24 and 25, the locking part 61a is for example the hole 61a. The hole 61a passes through the upper member 61 in the left and right direction and has a L shape when seen from the left and right direction. In more detail, in a state that the upper member 61 is locked to the screw 961, the hole 61a opens on the side of the thin display device 9, and is extended from this opening part toward the wall surface side, and successively bent and extended downward. With such a shape, in a state that the thin display device 9 is obliquely lifted, the upper member 61 can be pivoted toward the side of the thin display device 9 to insert the lower stripper bolt 932 into the hole 61a from the upper side.

As described above, the locking of the lower stripper bolt 932 can be cancelled by the cancellation lever 60, and furthermore, the thin display device 9 can be fixed in tilted posture by utilizing the cancellation lever 60. In such a way, since the cancellation lever 60 serves both a function of canceling the locking of the stripper bolt 932 and a function of locking the lower stripper bolt 932 with the thin display device 9 in tilted posture, the number of parts can be reduced.

While the invention has been shown and described in detail, the foregoing description is in all aspects illustrative and not restrictive. It is therefore understood that numerous modifications and variations can be devised without departing from the scope of the invention.

What is claimed is:

1. An attachment device for a suspended member to be placed between the suspended member and an attachment surface to attach said suspended member to said attachment surface, the attachment device comprising:
    a fixing member fixed to said attachment surface;
    at least one first operating part configured to be manipulated from one side in the first direction parallel to said attachment surface;
    at least one second operating part configured to be manipulated from said one side in said first direction;
    at least one first member configured to move in said first direction relative to said fixing member and configured to move said suspended member in said first direction relative to said fixing member based on an operation amount of said at least one first operating part;
    at least one second member fixed rotatably relative to said at least one first member and configured to rotate based on a operation amount of said at least one second operating part to move said suspended member in a second direction relative to said fixing member, wherein the second member is fixed to the first member rotatably on a rotation axis perpendicular to the second direction;
    a third operating part configured to be manipulated from said one side in said first direction; and
    a third member fixed rotatably relative to said at least one first member and configured to be rotated based on an operation amount of said third operating part to move said suspended member in the third direction crossing a plane including said first direction and said second direction relative to said fixing member.

2. The attachment device for the suspended member according to claim 1, wherein
    said at least one first operating part is two first operating parts,
    said at least one first member is two first members,
    said two first members are configured to be moved respectively based on said operation amounts of said two first operating parts, and
    said two first members are arranged side by side when seen from said first direction.

3. The attachment device for the suspended member according to claim 1, wherein
    said second direction is the front and rear direction perpendicular to said attachment surface, said at least one second operating part is two second operating parts, said at least one second member is two second members, said two second members are configured to be rotated respectively based on said operation amounts of said two second operating parts, and said two second members are arranged side by side when seen from the direction perpendicular to said front and rear direction.

4. The attachment device for the suspended member according to claim 1, wherein said at least one second member has:

a rotation axis portion fixed rotatably on a first rotation axis perpendicular to said first direction and said second direction relative to said at least one first member;

an effort point portion displaced in said second direction from said first rotation axis and configured to be subjected to force along said first direction based on said operation amount of said at least one second operating part; and a load point portion displaced in said first direction from said first rotation axis and configured to impose force onto said suspended member, and a distance between said effort point portion and said first rotation axis is longer than a distance between said load point portion and said first rotation axis.

5. The attachment device for the suspended member according to claim 1, wherein said at least one first operating part is a male screw member passing through said at least one first member from said one side in said first direction and being screwed into said fixing member, and said attachment device further comprises:

at least one first positioning part configured to position said at least one first operating part in said first direction relative to said at least one first member.

6. The attachment device for the suspended member according to claim 1, wherein said at least one second operating part is a male screw member passing through said at least one first member from said one side in said first direction, said at least one second member has:

a rotation axis portion fixed rotatably on a first rotation axis perpendicular to said first direction and said second direction relative to said at least one first member;

an effort point portion displaced in said second direction from said first rotation axis; and a load point portion displaced in said first direction from said first rotation axis and configured to impose force onto said suspended member, and said attachment device further comprises:

a positioning part configured to position said at least one second operating part in said first direction relative to said at least one first member; and a joint member to which said at least one second operating part screws, said joint member fixed rotatably on a second rotation axis parallel to said first rotation axis relative to said effort point portion.

7. The attachment device for the suspended member according to claim 1, wherein said at least one second member has a rotation member and a locking member, both the members being fixed to each other rotatably on a first rotation axis perpendicular to said first direction and said second direction, said rotation member is fixed rotatably on a second rotation axis displaced in said first direction from said first rotation axis in parallel to said first rotation axis relative to said at least one first member, and configured to be rotated based on said operation amount of said at least one second operating part, said rotation member and said locking member nip a protruding member fixed to said suspended member at least in said second direction at positions displaced in said second direction from said first rotation axis, and said locking member is rotated relative to said rotation member to release said protruding member in said second direction.

8. The attachment device for the suspended member according to claim 7, wherein said first direction is the vertical direction, said second direction is the front and rear direction perpendicular to said attachment surface, said at least one first member supports said suspended member at upper portion of said suspended member so that suspended member is rotatable on an axis parallel to the left and right direction perpendicular to said vertical direction and said front and rear direction, said protruding member is positioned in a lower portion of said suspended member, said attachment device further comprises:

a cancellation member having an upper member and a lower member, both the members being fixed movably in said vertical direction relative to said at least one first member, said lower member, in a state that the cancellation member is moved upward in said vertical direction, configured to lift said locking member upward, and to release said protruding member on the side of said suspended member in said front and rear direction, and said upper member is rotatable toward the side of said suspended member relative to said lower member in said state, and has a locking part configured to lock said protruding member in a state that the lower portion of said suspended member is displaced in said front and rear direction relative to the upper portion.

* * * * *